United States Patent
Kito

(10) Patent No.: US 7,175,269 B2
(45) Date of Patent: Feb. 13, 2007

(54) METHOD AND APPARATUS FOR DETECTING AN IMAGE AND ITS SURFACE QUALITY AND FORMING A CORRESPONDING COPY

(75) Inventor: Eiichi Kito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 323 days.

(21) Appl. No.: 10/801,569

(22) Filed: Mar. 17, 2004

(65) Prior Publication Data

US 2004/0183880 A1 Sep. 23, 2004

(30) Foreign Application Priority Data

Mar. 19, 2003 (JP) .............................. 2003-075957

(51) Int. Cl.
*B41J 3/407* (2006.01)
*B41J 2/01* (2006.01)
*G03G 15/00* (2006.01)

(52) U.S. Cl. .......................... 347/106; 347/105; 399/45

(58) Field of Classification Search ................ 347/14, 347/84, 101, 105, 106, 129; 156/212; 250/559.07; 355/38, 77; 356/369, 600; 358/3.24, 1.16; 382/108; 399/45, 100; 428/141, 451, 195.1; 430/14, 124, 503
See application file for complete search history.

(56) References Cited

U.S. PATENT DOCUMENTS

| | | | | | |
|---|---|---|---|---|---|
| 5,552,890 | A | * | 9/1996 | Nanna et al. ................ 356/369 |
| 5,764,262 | A | * | 6/1998 | Wu et al. .................... 347/101 |
| 5,974,233 | A | * | 10/1999 | Nishiyama et al. ......... 358/1.16 |
| 5,986,741 | A | * | 11/1999 | Kimura ........................ 355/38 |
| 6,010,791 | A | * | 1/2000 | Tan et al. .................... 428/451 |
| 6,088,546 | A | * | 7/2000 | Inoue et al. .................. 399/45 |
| 6,106,982 | A | * | 8/2000 | Mientus et al. ............... 430/14 |
| 6,180,328 | B1 | * | 1/2001 | Edwards et al. ............ 430/503 |
| 6,193,361 | B1 | * | 2/2001 | Wen ............................ 347/84 |
| 6,425,650 | B1 | * | 7/2002 | Walker et al. ................ 347/14 |
| 6,560,351 | B1 | * | 5/2003 | Hirota ........................ 382/108 |
| 6,561,643 | B1 | * | 5/2003 | Walker et al. .............. 347/105 |
| 6,838,687 | B2 | * | 1/2005 | Tullis et al. ........... 250/559.07 |
| 6,853,393 | B2 | * | 2/2005 | Akita .......................... 347/129 |
| 6,900,882 | B2 | * | 5/2005 | Iida .............................. 355/77 |
| 6,914,684 | B1 | * | 7/2005 | Bolash et al. ............... 356/600 |
| 6,939,002 | B2 | * | 9/2005 | Janosky et al. ............. 347/106 |
| 2001/0035257 | A1 | * | 11/2001 | Fujii et al. .................. 156/212 |
| 2003/0082473 | A1 | * | 5/2003 | Nakamura et al. .......... 430/124 |

(Continued)

FOREIGN PATENT DOCUMENTS

EP 1407893 A2 * 4/2004

(Continued)

*Primary Examiner*—Hai Pham
*Assistant Examiner*—Carlos Martinez, Jr.
(74) *Attorney, Agent, or Firm*—Whitham, Curtis, Christofferson & Cook, P.C.

(57) ABSTRACT

An apparatus detects image information ans surface quality of a subject image and for forms a copy with an image and surface quality corresponding to that of the subject. The apparatus generates image data and surface quality data, forms an image on a sheet based on the image data, and forms a surface textures on the sheet according to the surface quality data. The surface treatment optionally forms a non-uniform surface quality corresponding to a non-uniform surface quality.

23 Claims, 16 Drawing Sheets

U.S. PATENT DOCUMENTS

2003/0202214 A1* 10/2003 Akita et al. ................. 358/3.24
2004/0037583 A1*  2/2004 Machida ..................... 399/100
2004/0081799 A1*  4/2004 Kaminsky et al. .......... 428/141
2004/0086694 A1*  5/2004 Ide .......................... 428/195.1

FOREIGN PATENT DOCUMENTS

JP           2710881      2/1998
JP        2002-031921     1/2002

* cited by examiner

WHOLLY GLOSSY

WHOLLY MATTE

GLOSSY/ MATTE

METHOD AND APPARATUS FOR DETECTING AN IMAGE AND ITS SURFACE QUALITY AND FORMING A CORRESPONDING COPY

BACKGROUND OF THE INVENTION

1. Field of the Invention

The present invention relates to an image forming apparatus capable of reading image information and surface quality from a subject copy and readily and efficiently reproducing images including surface quality on various types of sheets.

2. Description of the Related Art

In the past, images have been formed by various methods such as silver halide photography, heat developing, inkjet recording, thermosensitive recording and electrophotography. In the prior art, techniques for controlling the surface qualities including the gloss of image prints obtained by these various methods are not well known.

However, Japanese Patent Application Laid-Open (JP-A) No. 05-053288 (Japanese Patent (JP-B) No. 2710881) discloses a photographic apparatus which, in addition to a processor part which produces a printed photograph by developing a printing paper which has been printed and exposed, also comprises a drying part and surface quality treatment part to finish the printed photograph. The surface quality treatment part of this photographic apparatus comprises a pressure roller having surface depressions and protrusions which forms a desired surface quality on the printed photograph surface, and a shift mechanism which sets this pressure roller in a state where it can be pressed against the printed photograph. As a result, printed photographs having a desired surface quality can easily be obtained without replacing printing papers or interrupting the printing and exposure.

However, the surface quality treatment part in this photographic apparatus described in JP-A No. 05-53288 had a construction wherein the printed photograph surface was pressed by a pressure roller having a desired transfer roughness, and the depressions/protrusions on the pressure roller surface were transferred to the printed photograph. The surface quality treatment part of this photographic apparatus was adapted for use only with silver halide photographic sheets. Also, to obtain particular surface quality, it was necessary to provide a number of rollers having surface roughness for each surface quality, so in practice only about 1–3 surface qualities could be realized. Therefore, according to JP-A No. 05-53288, only one type of treatment could be performed, there was no systematic generality, and performance was unsatisfactory from the viewpoints of operational efficiency and energy efficiency.

Further, regarding the photographic apparatus described in the JP-A No. 05-53288, neither mention nor suggestion is made of reading the surface quality of a subject copy and photographically printing the same surface quality as that of the subject copy.

Further, JP-A No. 2002-31921 proposes an image forming apparatus capable of reading image information and gloss from a subject copy and eliminating any difference in gloss between the subject copy and the printed image. However, it is extremely difficult for this image forming apparatus to accurately reproduce many different surface qualities of silver halide photographic sheets other than glossy, including silk, luster, matte, deep matte and crystal.

Therefore, no image forming apparatus capable of reading image information and surface quality of the subject copy and readily and efficiently reproducing copies of the original image including its surface quality is known as yet.

OBJECTS AND ADVANTAGES

An object of the present invention is to provide an image forming apparatus capable of reading image information and surface quality of the subject copy and readily and efficiently reproducing copies of the original image including its surface quality on any type of sheet selected from an inkjet sheet, thermosensitive recording sheet, heat developing sheet, electrophotographic sheet and silver halide photographic sheet.

SUMMARY OF THE INVENTION

An image forming apparatus according to the present invention comprises an image reading unit which reads image information and surface quality from a subject copy and supplies image data and surface quality data, an image processing unit which has recorded image preparing means for preparing image data for recording by subjecting the image data to prescribed image processing and surface quality determining means for determining the surface quality of the subject copy from the surface quality data and preparing surface quality determination data, and an image output unit which has image forming means for performing image formation processing on a recording material on the basis of the image data for recording and surface treatment means for performing surface treatment on a sheet on the basis of the surface quality determination data.

In the image forming apparatus according to the present invention, the image reading unit reads image information and surface quality from a subject copy and supplies image data and surface quality data. The image processing unit prepares image data for recording, determines the surface quality of the subject copy and prepares surface quality determination data. The image output unit performs image formation processing on a recording material and performs surface treatment on a sheet. As a result, the apparatus can read image information and surface quality from the subject copy, readily and efficiently reproduce copies of the original image including its surface quality, and efficiently transfer to various kinds of sheet such surface quality features as glossy, silk, luster, matte, deep matte and crystal.

In this case, preferable aspects include one in which the image reading unit has either a CCD sensor or a CMOS sensor capable of reading image information and surface quality from the subject copy; one in which the image reading unit has image reading means which reads image information on the subject copy and supplies image data, and surface quality reading means which reads the surface quality of the subject copy and supplies surface quality data; one in which the surface quality reading means has a surface quality detecting sensor which detects the surface quality of the subject copy; one in which the surface quality detecting sensor causes a light source to irradiate the subject copy with light, measures the luminous energy of mirror reflection (regular reflection) and the luminous energy of diffusion from the subject copy, and detects the ratio between the luminous energy of the regular reflection and the luminous energy of diffusion (regular reflection luminous energy/ diffused luminous energy); one in which the light source for the surface quality detecting sensor is infrared (IR) rays; one in which an embossed subject copy is irradiated in an oblique direction with a luminous flux, shades due to the embossment are read by either a CCD sensor or a CMOS sensor, and the surface quality of the subject copy is thereby detected; one in which the surface quality determining means determines the surface quality of the subject copy by evaluating the surface quality data against a level of surface quality determination; and one in which the surface quality determining means determines the surface quality of the subject copy by referring the surface quality data to a surface quality pattern database.

DESCRIPTION OF THE PREFERRED EMBODIMENTS

Figure 1:
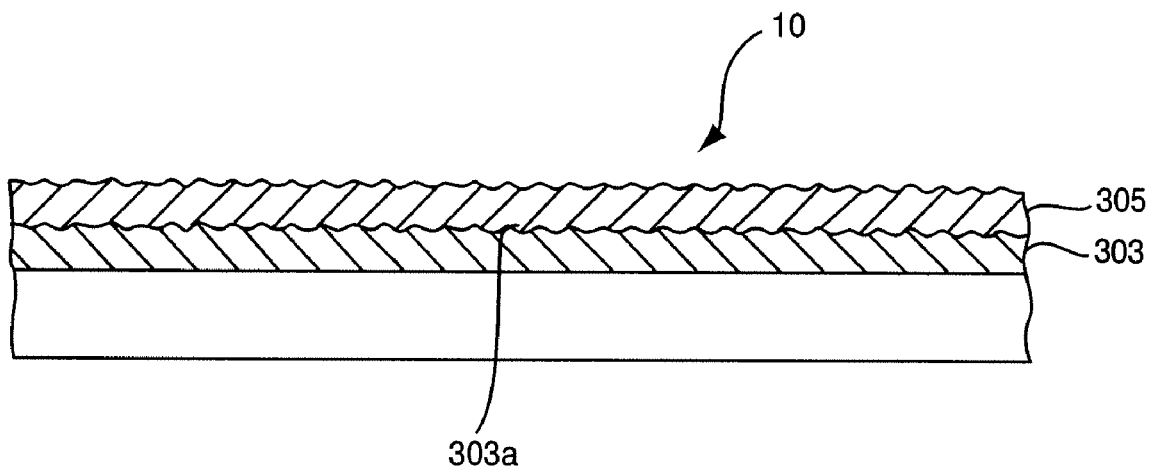
FIG. 1 is a schematic cross-sectional view showing an example of a sheet according to the present invention.

An image forming apparatus according to the present invention is provided with an image reading unit, an image processing unit and an image output unit, and may have other means or members as required.

-Image Reading Unit-

There is no particular restriction about the image reading unit as long as it can read image information and surface quality from a subject copy and supply image data and surface quality data, and a suitable type for a given purpose can be selected as desired. Available alternatives include: (1) one that reads image information and surface quality from a subject copy and supplies image data and surface quality data (e.g. a CCD sensor or a CMOS sensor), and (2) one that has image reading means (e.g. a CCD sensor or a CMOS sensor) which reads image information from a subject copy and supplies image data, and surface quality reading means (e.g. a surface quality detecting sensor) which reads the surface quality of the subject copy and supplies surface quality data.

There is no particular restriction about the image reading unit of (1), and a suitable type for a given purpose can be selected as desired. The most suitable alternatives include a charge coupled device (CCD) sensor and a complementary metal oxide semiconductor (CMOS) sensor. Available CCD sensors include, for instance, a line CCD scanner and an area CCD scanner. The CMOS sensor would make possible further reductions in size, power consumption and cost.

There is no particular restriction about the image reading means of the image reading unit of (2) and a suitable type for a given purpose can be selected as desired. For instance, it can use image data obtained by the reading function of a CCD sensor (a line CCD scanner or an area CCD scanner) or a CMOS sensor similar to those mentioned in (1).

It is preferable for the surface quality reading means to have a surface quality detecting sensor for reading the surface quality of the subject copy. There is no particular restriction about the surface quality detecting sensor, and a suitable type for a given purpose can be selected as desired. For instance, a sensor for detecting reflected light, reflected sound, reflected heat or the like can be chosen.

Suitable sensors as the surface quality detecting sensor include, in specific terms, (i) one which causes a light source to irradiate a subject copy with a luminous flux, and detects the ratio between the received luminous energy of the luminous flux of mirror reflection (regular reflection) and the received luminous energy of the luminous flux of the diffused luminous flux from the subject copy, and detects the ratio between them. As the sensor, a usual light emitting-receiving sensor can be used. As the present invention presupposes that the subject copy can be any photographic print or the like, the density varies with the point of measurement and accordingly cannot be standardized. According to the present invention, any photographic print or the like in which the color may vary from one subject copy to another or even from one point of measurement to another is used as the subject copy. Therefore, the reflection factor cannot be measured merely from reflected luminous energy, which depends on the color at the particular point of measurement. Also where the subject copy has a mirror surface, regular-reflected light is stronger, and diffused light is weaker. On the other hand, where the subject copy has a rugged surface, regular-reflected light is weaker, and diffused light is stronger. Therefore, the ratio between the regular-reflected light and the diffused light (regular-reflected light/diffused light) of light reflected without being absorbed by pigments depends on the surface quality of the subject copy. By utilizing this property and finding out the relationship between the regular-reflected light/diffused light ratio and the surface quality in advance, the surface quality of the subject copy can be determined from the measured regular-reflected light/diffused light ratio.

Figure 4:
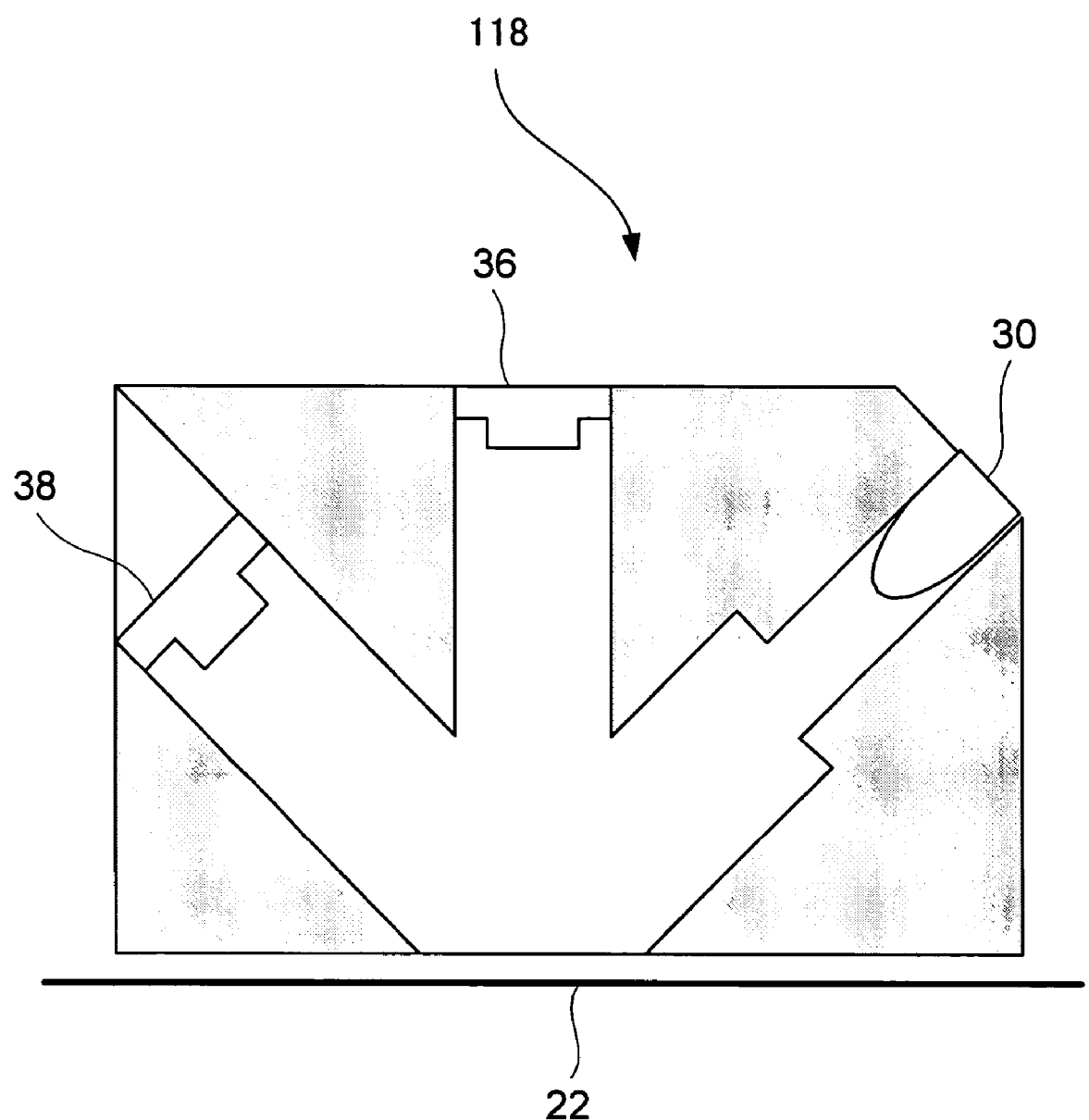
FIG. 4 roughly illustrates an example of surface quality detecting sensor.

An example surface quality detecting sensor 118 referenced above as type (i) can be used a configuration, as shown in FIG. 4, wherein a light source 30 is arranged in an oblique direction with respect to a subject copy 22 and there is provided a regular-reflected light sensor 38 and a diffused light sensor 36 which respectively detect the regular-reflected light and the diffused light resulting from irradiation in this arrangement. The regular-reflected light and the diffused light are then measured, and the surface quality of the subject copy is determined from the ratio of the regular-reflected light to the diffused light.

(ii) Where infrared (IR) rays are used as the light source, since infrared rays are not absorbed by pigments, the regular-reflected light of infrared rays is unaffected by the pattern of the subject copy. Therefore, the surface quality (gloss) can be determined by only measuring the regular-reflected light.

(iii) In a sensor which irradiates the embossed subject copy with a luminous flux from a light source and detects the received luminous energy of the luminous flux mirror-reflected from the subject copy, it is preferable for the light source be arranged so that the subject copy be irradiated by a luminous flux in an oblique direction. This facilitates determination of the surface quality of an embossed subject copy. Thus, irradiating an embossed subject copy with light in an oblique direction makes it easier for shades due to the embossment to be formed. These shades are read by a CCD sensor or the like as an image, and the surface quality can be determined from the pattern of shades. Although the light emitting-receiving sensor of (i) irradiates the subject in an oblique direction, it cannot detect the pattern of shades. This unit can detect the presence or absence of embossment and, if present, the pattern of the embossment by reading the whole subject copy with a CCD sensor and subjecting what has been read to image processing.

There is no restriction about the subject copy and any appropriate subject for a given purpose can be selected. A photographic print, a printed matter or the like would be suitable.

-Image Processing Unit-

The image processing unit has recorded image preparing means and surface quality determining means, and further may have other means as required.

-Recorded Image Preparing Means-

There is no particular restriction about the recorded image preparing means, and any means capable of subjecting image data supplied by the image reading unit to image processing, such as various ways of correction, to prepare image data for recording would be acceptable. Any appropriate known means can be selected.

Nor is there any restriction about the image processing, and any appropriate manner of image processing for a given purpose can be selected. Applicable manners include, for instance, correction of relative brightness, correction of an defective image, conversion of gradation, color conversion, hyper tone processing to compress the gradation range ultra-low frequency luminance components, hyper sharpness processing to emphasize sharpness while suppressing granulation.

The image data for recording prepared by the recorded image preparing means are supplied to the image output unit. Incidentally, it is also possible to store the image data for recording in a storage medium as an image file.

-Surface Quality Determining Means-

There is no particular restriction about the surface quality determining means as long as it can determine the surface quality of the subject copy from the surface quality data supplied by the image reading unit and prepare surface quality determination data, and any appropriate means for a given purpose can be selected. Conceivable means include, for instance: (1) means which evaluates the surface quality data against a preset level of surface quality determination, determines the surface quality of the subject copy, and prepares surface quality determination data on that basis; (2) means which refers the surface quality data to a surface quality pattern database built up in advance, determines the surface quality of the subject copy, and prepares surface quality determination data on that basis; and (3) means combining the means of (1) and (2) to determine the surface quality of the subject copy and prepare surface quality determination data on that basis.

There is no particular restriction about the level of surface quality determination, and any appropriate level for a given purpose can be selected. Conceivable measures of level include the one with glossy, silk, luster, matte, deep matte and crystal, each graded into 1 to 5, for instance.

There is no particular restriction about the surface quality pattern database, and any appropriate database type for a given purpose can be selected. Conceivable database types include, for instance: (1) a database combining a sheet type selected from thermosensitive recording sheet, inkjet sheet, electrophotographic sheet, heat developing sheet, silver halide photographic sheet and silver halide digital photographic sheet and surface qualities; (2) a database combining a sheet type and conditions of treatment; and (3) a database combining a sheet type, surface qualities and conditions of treatment.

-Image Output Unit-

The image output unit has image forming means and surface treatment means, and further may have other means as required.

-Image Forming Means-

There is no particular restriction about the image forming means as long as it can subject a recording material to image formation processing on the basis of the image data for recording, and may be suitably selected from image forming apparatuses known in the art which form images by image forming methods known in the art such as for example inkjet recording, thermosensitive recording, silver halide photography, silver halide digital photography, heat developing/recording or electrophotography.

There is no particular restriction about the recording material, and any appropriate material for a given purpose can be selected, such as roll paper or sheet.

The control system in the image forming means is not particularly limited and may be selected from among those known in the art. As an example, in the case of a silver halide digital photographic printer, it comprises a laser exposure part and processor part (developing part, bleaching/fixing part, water rinsing part and drying part), these parts being controlled by a ROM, CPU and RAM via an interface.

-Surface Treatment Means-

There is no particular restriction about the surface treatment means as long as it can subject a sheet to surface treatment on the basis of the surface quality determination data, and any appropriate means for a given purpose can be selected. It has sheet heating means for heating the treatable surface of the sheet being kept in contact with a contact member and sheet cooling means for cooling the sheet being kept in contact with the contact member, and further may have other means as required.

Incidentally, there is no particular restriction about the position of surface treatment in the sequence of processing, and it may be done either before or after image formation, but usually it is preferable for surface treatment to be done after image formation.

-Sheet Heating Means-

There is no particular restriction about the sheet heating means as long as it can heat and pressurize a sheet until its thermoplastic resin layer becomes soft enough to permit deformation and thereby deform the thermoplastic resin layer, and any appropriate means for a given purpose can be selected. Conceivable means include, for instance, what is used as a fixing device in a known electrophotographic apparatus, preferably one having a pair of heating rollers.

The contact member is not particularly limited regarding shape, structure, size and material, and may be suitably selected according to the purpose, for example a sheet cut to a desired size or an endless belt. The former has an advantage that its surface quality can be altered sheet by sheet, and the latter has advantages of ease in continuous treatment and in peeling the endless belt from the contact member among other features.

If an endless belt is used as the contact member, it is particularly preferred that the sheet heating means comprises the endless belt and a pair of heat rollers disposed so that the endless belt is in pressure contact from its inner side and outer side.

The endless belt is not particularly limited, and may be suitably selected according to the purpose, but the belt used in a belt fixing apparatus of an electrophotographic apparatus known in the art can be used. The belt material is not particularly limited, and may be suitably selected from among those known in the art. The endless belt surface may be surface-treated by a silicone or fluorinated surface treatment agent in order to improve the separation ability of the sheet.

The material of the contact member is not particularly limited provided that it can impart a desired surface quality to the sheet and may be suitably selected according to the purpose, e.g., a material having heat resistance properties above the softening point temperature of the thermoplastic resin layer to which surface quality is imparted, such as a polyethylene terephthalate film, polyethylene film, polypropylene film, nylon film, polyimide film, polystyrene film and fluorinated olefin film.

There is no particular restriction about the surface quality of the contact member, and any appropriate surface quality for a given purpose can be selected, but it is preferable to be selected from gloss, matte and embossment.

A gloss surface imparts smoothness and luster to the sheet surface which is subjected to heat and pressure between the nip rollers of a super calender or gloss calender having a smoothed surface, cooling and separation.

The matte surface is obtained by performing roughness treatment (matte treatment) on a protrusion-shaped reflecting surface. Examples of the matte treatment methods are sandblasting, hot extrusion and plasma ion processing.

An effect substantially identical to this matte treatment can be obtained by providing a coating layer comprising a transparent bead coating layer.

The embossed surface can be obtained by embossing the surface of the contact member. This is the forming of depressions/protrusions in a material by etching or by rolling using an embossing roller in which a depression/protrusion pattern is engraved.

The embossing roller is a metal roller having a diameter of 100–500 mm wherein projections are engraved corresponding to the depressions in the surface. Depressions are formed in the material surface by rolling the material between the embossing roller and an elastic roller with a flat (smooth) surface. It is preferred that the rolling temperature is 80–200° C., the speed is 30–150 m/min and the pressure is of the order of 1–20 t/m$^2$.

Embossing treatment is described for example in "The Surface Technology Manual (edited by Surface Finishing Society of Japan, published by Nikkan Kogyo Shimbun (1998))", and "The New Paper Coating Manual, (edited by Industrial Paper Times Co., published by Industrial Paper Times Co. (1980)".

There is no particular restriction about the pair of heating rollers, and any appropriate type of heat rollers for a given purpose can be selected. It can be selected as desired from types of paired heating rollers used in a known electrophotographic apparatus, preferably what permits control of the nip pressure, heating temperature and other factors.

Due to this pair of heat rollers, the sheet and contact member pass superimposed on each other through the nip part formed between this pair of heat rollers in synchronism with the rotation of the pair of heat rollers while being heated. If pressure is applied to the nip part, the sheet and contact member pass through superimposed on each other while heat and pressure are applied to the nip part.

The heating temperature produced by the sheet heating means is not particularly limited and may be suitably selected according to the type of sheet, but it is normally of the order of 50–120° C., preferably of the order of 80–110° C. when the sheet has a thermoplastic resin layer and more preferably 95–105° C. when the thermoplastic resin layer is a polyethylene layer. By using the sheet heating means, embossment can be formed by transferring the surface quality of the contact member to the interface of the image forming layer on the thermoplastic resin layer side positioned on the image forming layer side of the sheet and to the image forming layer.

-Sheet Cooling Means-

The sheet cooling means is not particularly limited provided that it can cool the sheet treatment surface treated by the sheet heating means while it is in contact with the contact member, and may be suitably selected from among cooling apparatuses known in the art according to the purpose, but from the viewpoint of being able to adjust cooling conditions, it is preferably a means which can blow air to adjust the cooling temperature. The number of sheet cooling means is not particularly limited, and may be suitably selected according to the purpose.

The position in which the sheet cooling means is provided is not particularly limited and may be suitably selected according to the purpose, but it is usually downstream from the sheet heating means in the sheet transport direction. If the sheet heating means comprises the pair of heat rollers and the endless belt described above, it is preferably provided between the pair of heat rollers and rotating rollers suspending the endless belt such that it is free to rotate together with the pair of heat rollers, and in the vicinity of the endless belt. In this case, the sheet is cooled by the sheet cooling means between the pair of heat rollers and the rotating rollers.

-Surface Quality Control Means-

There is no particular restriction about the surface quality control means as long as it can control, on the basis of the surface quality determination data, the conditions of treatment by at least either the sheet heating means or the sheet cooling means and any selected one of possible surface qualities of the contact member. A computer or the like can be used for this purpose and, for instance, a control system used in a known image forming apparatus or the like can be modified according to the specific purpose.

Conceivable manners of the surface quality control include, for instance, one in which prescribed conditions of treatment or treating mode are read out of storage means (e.g. a ROM, HD or the like) in which the conditions of treatment or the treating mode are stored and the driving of various means in the surface treatment means can be controlled by a CPU or the like.

There is no particular restriction about the treatment conditions selecting means, and any appropriate means for a given purpose can be selected. Preferably, it should have a function to select the desired treating mode out of a plurality of treating modes for which conditions of treatment of sheets (control parameter file) are prescribed, and more preferably it should have a function to select the desired treating mode out of the plurality of treating modes on the basis of determination by the surface quality determining means. In this case, it is preferable in an appropriate surface treatment can be applied according to the type of sheet.

The sheet type is not particularly limited, but it preferably comprises at least a thermoplastic resin layer and may for example be suitably selected from among sheets (media) used in image recording methods known in the art. Specific examples are a thermosensitive recording sheet, inkjet sheet, electrophotographic sheet, hot developing sheet, silver halide photographic sheet and silver halide digital photographic sheet which are used in photographic prints, but those having the thermoplastic resin layer on the surface are particularly preferred.

The treatment mode is not particularly limited and may be suitably selected according to the purpose, for example it may be set by at least one type of treatment condition. Preferably, for example, about three types of treatment mode can be set for each sheet type, or for each product type even if the sheet type is the same, so that the surface state obtained after treatment can respectively be adjusted to gloss or matt.

The treatment conditions are not particularly limited and may be suitably selected according to the purpose, for example the heating temperature, pressure force, heating time and pressure time in the sheet heating means, or the cooling temperature and cooling time in the sheet cooling means. More specifically, these include the temperature of the heat rollers on the inner side of the endless belt in the pair of heat rollers, the temperature of the heat rollers forming the nip part in contact with the endless belt, the pressure of the nip part, an air blower amount (volume of airflow) of a cooling fan in the cooling apparatus, the distance between the pair of heat rollers and the rotation rollers, and the endless belt rotation speed (sheet transport speed).

Control of the conditions of treatment by the surface quality control means can be accomplished by appropriately modifying the driving of the sheet heating means, the sheet cooling means and the like. More specifically, for instance, the heating temperature of the sheet heating means can be controlled by raising or lowering the electric power of the pair of heating rollers; the heating duration of the sheet heating means can be controlled by accelerating or decelerating the rotations of the pair of heating rollers; the cooling temperature of the sheet cooling means can be controlled by raising or lowering the electric power of the cooling device to increase or decrease the amount of cool air supplied; and the cooling duration of the sheet cooling means can be controlled by decelerating the rotation of the endless belt or extending or contracting the distance from the pair of heating rollers to the rotation rollers for the endless belt.

It is preferable for the surface quality of the contact member to be selected from gloss, matte and embossment.

-Gloss Control Means-

There is no particular restriction about the gloss control means as long as the surface treatment means can control the surface gloss of the sheet to make it more or less glossy than or as glossy as the surface of the subject copy, and any appropriate means for a given purpose can be selected. Control of the gloss can be accomplished by varying the pressure to be applied or the level of mirror finish (degree of surface smoothness) of the belt or sheet.

It is also preferable for the gloss control means to have a operation screen display means for displaying the conditions of treatment in a selectable way on the screen. This provides an advantage of allowing the operator to select the available gloss of the image as desired.

The operation screen display means is not particularly limited, and may for example be a monitor screen known in the art. The display screen produced by the operation screen display means is not particularly limited and may be suitably selected according to the purpose, for example a screen which displays the degree of gloss after treatment so that it can be selected, including at least one of gloss and matt, and also displays the sheet type so that at least one can be selected from a thermosensitive recording sheet, inkjet sheet, electrophotographic sheet, hot developing sheet, silver halide photographic sheet and silver halide digital photographic sheet.

-Surface Quality Partial Control Means-

There is no particular restriction about the surface quality partial control means as long as it can form a surface quality partially varying the sheet surface, and any appropriate means for a given purpose can be selected. For instance, there is no particular restriction about the sheet heating means as long it can, either by itself or in collaboration with the sheet cooling means, make the quality of one part of the treatable face different from other parts by heating the sheet to be surface-treated, and any appropriate means for a given purpose can be selected. Preferable examples include what can uniformly heat the treatable face of the sheet (uniform heating means) and what can heat it imagewise (imagewise heating means).

The uniform heating means is commonly used for heating the treatable face of the sheet in a state of being in contact with a contact member (contact state) or in a state of not being in contact with the contact member (non-contact state), and preferably should have a pair of heating rollers or be a heater (hot stamper). More preferably they should also have a pressurizing function, namely have a pair of heating and pressurizing rollers or be a heat and pressure heater (hot pressure stamper).

There is no particular restriction about the pair of heating rollers (heating and pressurizing rollers), and any appropriate means for a given purpose can be selected, but a similar device to the aforementioned can be used.

The pair of heaters (hot stampers) or pair of heat and pressure heaters (hot pressure stampers) are not particularly limited and may be suitably selected according to the purpose, but for example those bearing the design or pattern which it is finally desired to obtain on the sheet treatment surface, are preferred.

Due to the pair of heaters (hot stampers) or the pair of heat and pressure heaters (hot pressure stampers), the sheet is heated while pressure is applied to the treatment surface, the thermoplastic resin layer softens or melts, and the design or pattern formed on the surface of the pair of heaters (hot stampers) or the pair of heat and pressure heaters (hot pressure stampers) is transferred to the surface to be treated. As the design or pattern is formed with at least one of a glossy surface and a matte surface, the sheet treatment surface is also obtained as a surface comprising at least one of a glossy surface and a matte surface.

The imagewise heating means may also be used for heating when the sheet treatment surface is heated while in contact with the contact member (contact state), but in general, it is used for heating when the sheet treatment surface is not brought into contact with the contact member (non-contact state).

In the case of the imagewise heating means, only a part of the sheet which is imagewise-heated by the imagewise heating means is softened and melted, and a depression/protrusion shape pattern can be formed on the sheet by transferring the surface qualities of the contact member to the interface between the thermoplastic resin layer and the image forming layer on the image forming layer side of the sheet, and to the image forming layer. Thus, by combining the imagewise heating means with the surface qualities of plural contact members, the depression/protrusion shape pattern on the sheet can be controlled, and as a result, a desired glossiness distribution can be obtained on the sheet surface.

The imagewise heating means is not particularly limited and may be suitably selected according to the purpose, for example it is not particularly limited provided that a desired part of the sheet is heated to a temperature at which its thermoplastic resin layer softens and is able to deform, thus bringing about deformation of the thermoplastic resin layer, and may for example comprise a thermal head.

The thermal head is not particularly limited and may be selected from among those known in the art used in thermosensitive recording printers or the like, for example a line thermal head wherein heating elements are arranged in a line, or a thermal head wherein plural line thermal heads are arranged in parallel rows and plural heating elements are arranged horizontally and vertically, but the latter is preferred.

The means which controls the drive of the heating elements in the thermal head so that imagewise heating can be performed is not particularly limited and may be suitably selected according to the purpose, for example a computer or the like.

The contact member may conveniently be a means wherein its surface qualities are different in at least one part thereof, or its thermal conduction properties are different in at least one part thereof. Specifically, if a contact member is used wherein the surface qualities are different in at least one part, the sheet is uniformly heated by the sheet heating means, and the surface qualities of the contact member are transferred to the sheet treatment surface in contact with the contact member when it has softened and melted due to the heat. Therefore, if the contact member has a gloss surface and a matte surface, the gloss surface and matte surface are transferred to the sheet, so that at least part of the sheet comes to have different surface qualities. Alternatively, if a contact member is used wherein the thermal conduction properties are different in at least one part, even if the sheet heating means heats the contact member uniformly, the thermal conduction properties of at least part of the contact member are different, so the sheet is not heated uniformly. As a result, the sheet comes in contact with the contact member wherein only at least part thereof has softened and melted, so when it is separated from the contact member, the surface qualities of at least one part are different.

The contact member is not particularly limited regarding shape, structure, size and material, and may be suitably selected according to the purpose, for example a sheet cut to a desired size or an endless belt. In the former case, there is the advantage that the surface state can be varied as desired for each cut sheet, while in the latter case, there is the advantage that continuous treatment is easy, and there is easy separation from the contact member and this endless belt.

The cut sheet may for example have a completely gloss surface or a completely matte surface, but if the sheet treatment surface comprises an image part (photographic image part or the like) and non-image part (character information part, white background or the like), the locations corresponding to the image part may have a gloss surface and the locations corresponding to the non-image part may have a matte surface. In the latter case, the image part of the sheet treatment surface obtained has high gloss and excellent quality, and the non-image part has excellent writing properties.

The endless belt is not particularly limited and may be suitably selected according to the purpose, for example it is preferably designed so that it can treat sheets continuously, but more preferably takes a form wherein plural contact members each corresponding to one sheet are joined together, the sheets being brought into contact continuously one at a time. Referring to the part of the endless belt corresponding to the contact member in this aspect as a "contact member corresponding part", the contact member corresponding part may have different surface qualities, and if the sheet treatment surface has an image part (photographic image part) and a non-image part (white background), it is preferred that the locations corresponding to the image part have a gloss surface and the locations corresponding to the non-image part have a matte surface. In this case, the image part of the sheet treatment surface obtained has high gloss and excellent quality, and the non-image part has excellent writing properties.

-Sheet-

The sheet is not particularly limited and may be suitably selected according to the purpose, for example, an inkjet sheet, thermosensitive recording sheet, heat developing sheet (e.g., as disclosed in JP-A No. 06-130632), electrophotographic sheet, silver halide photography sheet or the like. The sheet may also be a sheet prior to image forming or a sheet after image forming.

The inkjet sheet may for example comprise a color material receiving-layer having a porous structure on a support, wherein a liquid ink such as an aqueous ink (using a dye or pigment as the color material) or oil-based ink, or a solid ink which is a solid at ordinary temperature and is melt-liquefied to supply the printed image, is absorbed by the color material-receiving layer to form the image.

The electrophotographic sheet may for example comprise at least a toner-receiving layer on a support, wherein this toner-receiving layer receives at least one of colored toners and black toner to form the image.

The thermosensitive recording sheet may for example be a thermosensitive transfer sheet having a structure comprising at least a heat-melting ink layer as an image forming layer on a support, wherein ink from the heat-melting ink layer is heated by a thermosensitive head and is melt transferred to a thermosensitive transfer/recording image-receiving sheet, or a thermosensitive transfer sheet having a structure comprising at least an ink layer containing a heat-diffusing pigment (sublimating pigment) on a support wherein the heat-diffusing pigment from the ink layer is heated by the thermosensitive head and is transferred by sublimation to a thermosensitive transfer/recording image-receiving sheet, or a thermosensitive material used in the thermo-autochrome method (TA method) having a structure comprising at least a heat coloration layer on a support wherein an image is formed by repeatedly heating with a thermosensitive head and fixing by ultraviolet light.

The sheet comprises at least a thermoplastic resin layer on one or both surfaces of a base, comprises an image forming layer on the thermoplastic resin layer, and if required may further comprise a surface protection layer, interlayer, undercoat layer, cushion layer, charge regulating (prevention) layer, reflecting layer, color tone adjusting layer, storage properties improving layer, anti-adhesion layer, anti-curl layer or smoothing layer.

Figure 3:
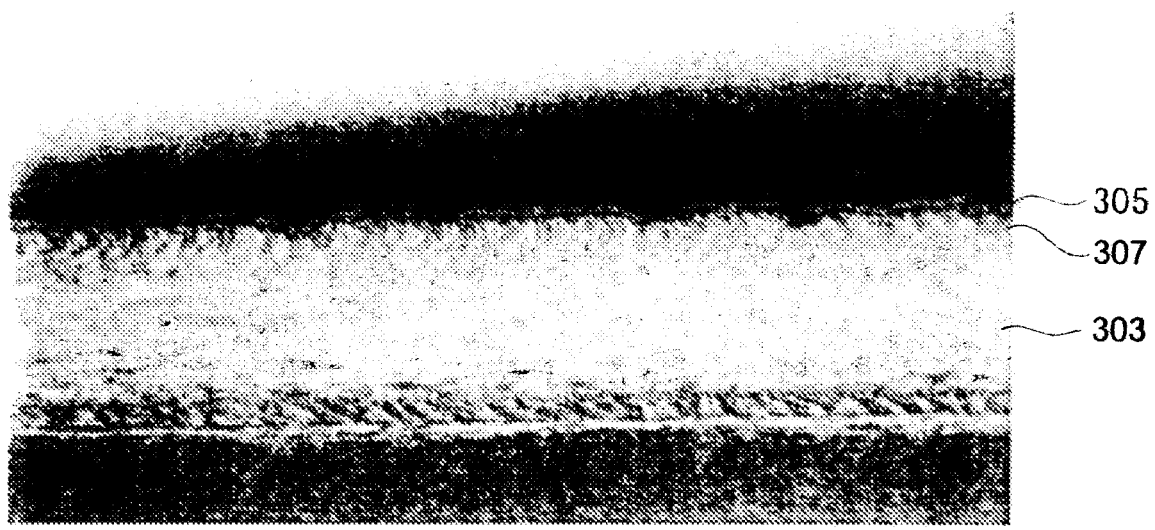
FIG. 3 is a cross-sectional photograph of a sheet after surface treatment.

As shown in FIG. 1, according to the surface treatment of the present invention, in the sheet 10, the surface quality of the contact member can be transferred not only to the surface of the image recording layer 305, but also to the interface 303a of the thermoplastic resin layer 303 with the image recording layer on the image recording layer side. This is observed in the cross-sectional photograph of FIG. 3 (magnification: 138 times), showing that in the cross-section of the sheet after surface treatment, the image recording layer is also deformed following the deformation of the thermoplastic resin layer 303. This shows also that the surface quality is transferred not only to the image recording layer but also to the thermoplastic resin layer. This shows also that the film thickness of the image recording layer 305 is substantially constant after the surface treatment as well.

Figure 2:
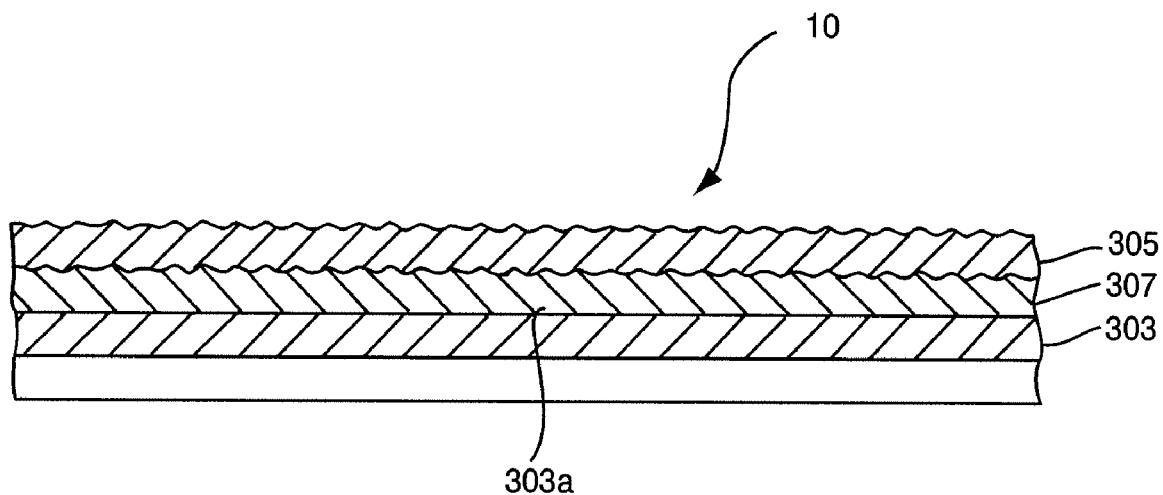
FIG. 2 is a schematic cross-sectional view showing an example of a sheet according to another aspect of the present invention.

Further, as shown in FIG. 2, when the sheet 10 comprises an interlayer 307 between the thermoplastic resin layer 303 and image recording layer 305, the surface quality of a content member can be transferred to the surface of the image recording layer 305, and the interface 303a between the thermoplastic resin layer 303 and interlayer 307.

-Base-

Examples of the base include synthetic paper (synthetic paper made from, for example, polyolefins or polystyrenes), woodfree paper, art paper, (double-sided) coated paper, (double-sided) cast coat paper, mixed paper made from polyethylene or another synthetic resin pulp and natural pulp; Yankee paper, baryta paper, wallpaper, backing paper, synthetic resin- or emulsion-impregnated paper, synthetic rubber latex-impregnated paper, paper comprising a synthetic resin as an internal additive, paperboard, cellulosic fiber paper, and other paper substrates; films and sheets of plastics or polymers such as polyolefins, poly(vinyl chloride), poly(ethylene terephthalate), poly(styrene methacrylate), poly(ethylene naphthalate), polycarbonate-poly(vinyl chloride), polystyrenes, polypropylenes, polyimides, celuloses such as triacetylcellulose; films and sheets obtained by subjecting these plastic films and sheets to a treatment, such as addition of a pigment such as titanium oxide for imparting white-reflecting properties; fabrics; metals, and glass.

Each of these bases can be used alone or in combination as a multilayer assemblage.

Examples of the base can also be found in JP-A No. 62-253159 (pp. 29–31), JP-A No. 01-61236 (pp. 14–17), JP-A No. 63-316848, JP-A No. 02-22651, JP-A No. 03-56955, and U.S. Pat. No. 5,001,033.

The thickness of the base is generally from 25 to 300 μm, preferably from 50 to 260 μm, and more preferably from 75 to 220 μm.

The stiffness (rigidity) of the base is not specifically limited, can be appropriately selected depending on an intended purpose and are preferably near to those in bases for use in color silver halide photography when the sheet is used as an image-receiving sheet of photographic quality.

The base may further comprise various additives appropriately selected according to the purpose within ranges not adversely affecting the advantages of the present invention.

Such additives include, but are not limited to, brightening agents (whitening agents), conductant agents, fillers, and pigments and dyes such as titanium dioxide, ultramarine blue, and carbon black.

The base may be subjected to any of surface treatments and/or primary coatings at one or both sides thereof to thereby improve adhesion with another layer such as a thermoplastic resin layer arranged thereon.

Such surface treatments include, for example, embossing or printing to form a glossy surface, a fine surface described in JP-A No. 55-26507, a matte surface or a tweed surface, corona discharge treatment, flame treatment, plasma treatment, and other activation treatments.

Each of these treatments can be employed alone or in any combination. For example, the base is subjected to the embossing and then to the activation treatment. It may be further subjected to the undercoating treatment after a surface treatment such as the activation treatment.

The base may be coated with a hydrophilic binder, a semiconductive metal oxide such as alumina sol or tin oxide, and an antistatic agent such as carbon black on its front side and/or backside. Typical disclosure of these coated bases can be found in, for example, substrates in JP-A No. 63-220246.

-Thermoplastic Resin Layer-

The thermoplastic resin forming the thermoplastic resin layer is not specifically limited, may be selected according to the purpose and includes, for example, polyolefins, poly(vinyl chloride)s, poly(ethylene terephthalate)s, polystyrenes, polymethacrylates, and triacetylcellulose, of which polyolefins are preferred. Each of these resins can be used alone or in combination.

Generally, a low-density polyethylene is used as the polyolefin. However, for improving the thermal resistance of the support, it is preferred to use a polypropylene, a blend of a polypropylene and a polyethylene, a high-density polyethylene, or a blend of the high-density polyethylene and a low-density polyethylene. From the viewpoint of cost and its suitableness for the lamination, it is preferred to use the blend of the high-density polyethylene and the low-density polyethylene.

The blend of the high-density polyethylene and the low-density polyethylene is used in a blend ratio (a mass ratio) of, for example, from 1:9 to 9:1, preferably from 2:8 to 8:2, and more preferably from 3:7 to 7:3. When the thermoplastic resin layer is applied to both sides of the support, the backside of the support is, for example, preferably the high-density polyethylene or a blend of the high-density polyethylene and the low-density polyethylene. The molecular weight of the polyethylenes is not particularly limited. Desirably, both of the high-density polyethylene and the low-density polyethylene have a melt index of from 1.0 to 40 g/10-min and a high extrudability.

The sheet or film to be laminated may be subjected to a treatment to impart white reflection thereto. For example, a pigment such as titanium dioxide is incorporated into the sheet or film.

-Image-Forming Layer-

The image forming layer, in the case of silver halide photography, corresponds to an emulsion layer which generates the colors YMC, and in the present invention means an emulsion layer prior to exposure and developing, or an emulsion layer after exposure and developing.

In the case of inkjet, it corresponds to an inkjet image-receiving layer which receives ink, and in the present invention means an ink receiving layer prior to adhesion of ink or an ink receiving layer after adhesion of ink.

In the case of electrophotography, it corresponds to a toner image-receiving layer, and in the present invention means a toner image-receiving layer prior to adhesion of toner or a toner image-receiving layer after adhesion of toner.

The image forming layer and thermoplastic resin layer may be identical.

-Other Means-

The other means in the surface treatment means are not particularly limited and may be suitably selected according to the purpose, for example a positioning means, preheating means, sheet pressure means or control means, etc.

The positioning means performs the positioning of the sheet and contact member. If this positioning means is provided, surface treatment can be performed without any positional offset on the sheet surface to be treated, and as it offers excellent surface treatment efficiency and reliability, it is very advantageous.

The specific examples of the positioning means are not particularly limited and may be suitably selected according to the purpose, but a sensor or the like is convenient. This sensor is not particularly limited, and may be a sensor which detects reflected light or reflected sound.

The preheating means is a means which preheats the sheet before it is heated by the sheet heating means.

If this preheating means is provided, the required heat amount when the sheet is heated by the sheet heating means will be less, and different parts of the sheet treatment surface can be brought to the softening state or melting state without any risk of the heat being insufficient, which is an advantage. Also, as the preheating means has a small thermal capacity and can heat the sheet while it is being transported, it is effective when a thermal head having a necessarily short heating time is used.

The specific examples of the preheating means are not particularly limited and may be suitably selected according to the purpose, i.e., a heat roller, heater or a heating part of the image forming apparatus (e.g., the drying part of a minilab, or the fixing part of an electrophotographic apparatus). In this case, the heating part and surface treatment part must be brought sufficiently close together so that the temperature of the printed paper which has been heated in the drying part, does not fall too much.

The sheet pressure means is a means which brings the sheet and contact member into pressure contact.

If this sheet pressure means is provided, when the sheet is heated by the sheet heating means, the surface qualities of the contact member can be transferred even if the sheet is not brought into contact with the contact member while being heated, and it is very advantageous.

The specific examples of the sheet pressure means are not particularly limited and may be suitably selected according to the purpose, e.g. a pressure roller or the like.

The control means may have the function of selecting a heating pattern according to the type of sheet, customer specifications and shop information, or controlling the operation of the sheet heating means and controlling surface treatment conditions, and may have the further function of controlling the superimposition position of the sheet and contact member based on information supplied by the positioning means.

The image forming apparatus according to the present invention can read image information and surface quality from a subject copy, and readily and efficiently reproduce the original image including its surface quality on a kind of sheet selected from an inkjet sheet, thermosensitive recording sheet, heat developing sheet, electrophotographic sheet and silver halide photographic sheet.

The present invention will now be described referring to specific examples, but it should be understood that the present invention is not limited in any way thereby.

EXAMPLE 1

Figure 5:
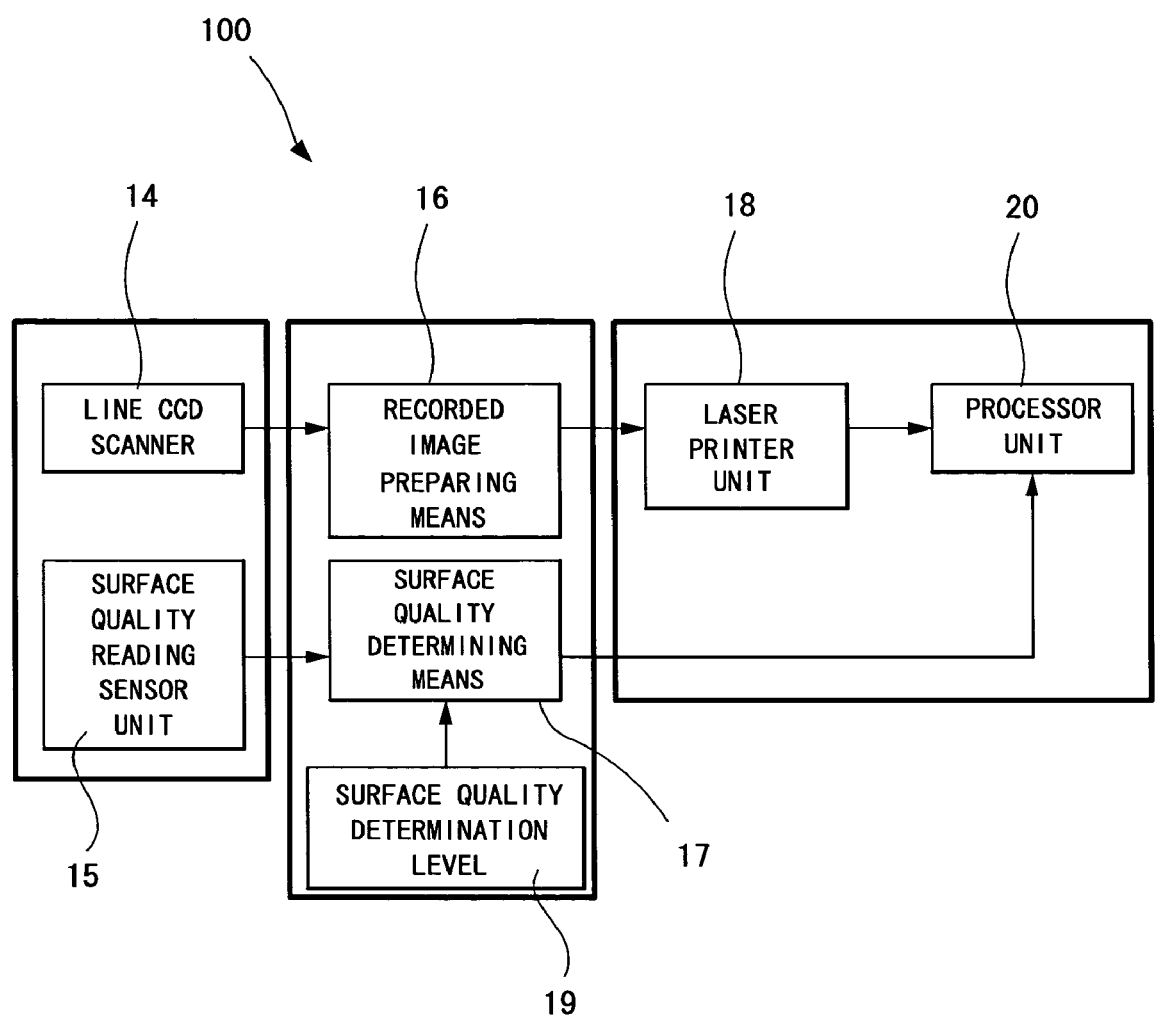
FIG. 5 schematically illustrates an example of image forming apparatus according to the present invention.

This example is a silver halide digital photograph printing device. The silver halide digital photograph printing device uses known constituent elements. Thus, this silver halide digital photograph printing device 100 comprises, as shown in FIG. 5, a line CCD scanner 14 and a surface quality reading sensor unit 15 as its image reading unit.

It further has, as its image processing unit, recorded image preparing means 16 which subjects image data to prescribed image processing to prepare image data for recording and surface quality determining means 17 which determines the surface quality of the subject copy from the surface quality data and prepares surface quality determination data.

As its image output unit, the device has a laser printer unit 18 and a processor unit 20. This laser printer unit 18 is provided with a laser beam source which emits R, G and B laser beams and irradiates with image recording photographic paper with laser beams modulated according to image data for recording entered from the image processing unit to record an image on the image recording photographic paper by scanning exposure. This processor unit 20 subjects the image recording photographic paper on which an image has been recorded by the laser printer by scanning exposure to such treatments as color development, bleaching/fixing, water rinsing and drying and surface treatment. The image is thereby formed on the photographic sheet. The image recording photographic paper is in a sheet form.

Figure 6:
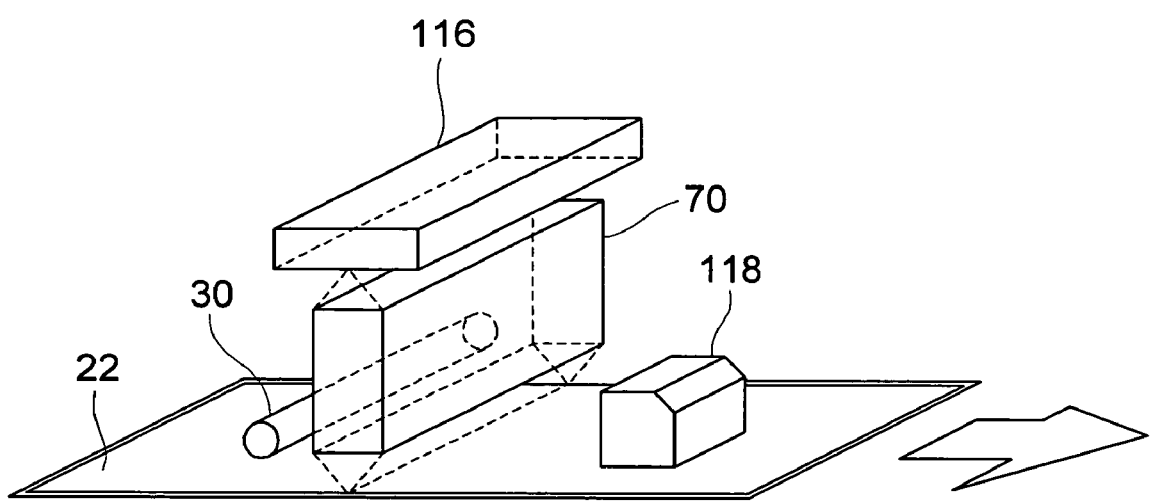
FIG. 6 illustrates the configuration of an example of line CCD scanner for reading subject copies.

Next will be described the configuration of the line CCD scanner 14. FIG. 6 schematically illustrates the configuration of the optical system of the line CCD scanner 14. This optical system consists of a fluorescent lamp, an LED or the like, and is provided with a line-shaped light source 30 for irradiating a subject copy 22 with light. A SELFOC lens array 70 for causing the light emitted from the light source 30 and reflected by the subject copy 22 to form an image on a line CCD 116 is arranged therein. Reference numeral 118 in FIG. 6 denotes a surface quality detecting sensor. Incidentally, although the light source 30 is arranged to the left of the SELFOC lens array 70 in FIG. 6, two light sources may as well be arranged to both the right and left of it. Especially where a subject copy of an embossed image is to be read, while the subject copy should be irradiated with luminous fluxes from both right and left not to let shadows be cast when image data are read, the subject copy should be irradiated with a luminous flux from only one side, right or left, to let shadows be cast when embossment is to be read. Therefore, when a subject copy of an embossed image is to be read, light sources 30 are arranged on the right (not shown) and left sides.

The configuration of the line CCD 116 is such that three lines of sensing units in each of which many photoelectric converting elements consisting of CCD cells are arranged in a row and electronic shutter release means is provided are arranged in parallel to and at intervals between each other and the light incidence side of each sensing unit is fitted with one of R, G and B color separation filters (a so-called three-line color CCD). In the line CCD 116, in the vicinity of the sensing units are provided transfer units, one per sensing unit, and electric charges accumulated in the CCD cells of each sensing unit is sequentially transferred via the matching transfer unit.

The surface quality detecting sensor unit 15 has the surface quality detecting sensor 118 shown in FIG. 4. This surface quality detecting sensor 118 has a regular-reflected light measuring sensor 38 for detecting regular-reflected light and a diffused light measuring sensor 36 for detecting diffused light when the subject copy 22 is irradiated in an oblique direction, and thus measures regular reflection luminous energy and diffused luminous energy. Incidentally, where infrared rays are used as the light source, the surface quality (gloss) can be determined by merely measuring the regular-reflected light because infrared rays are not absorbed by pigments.

Figure 7:
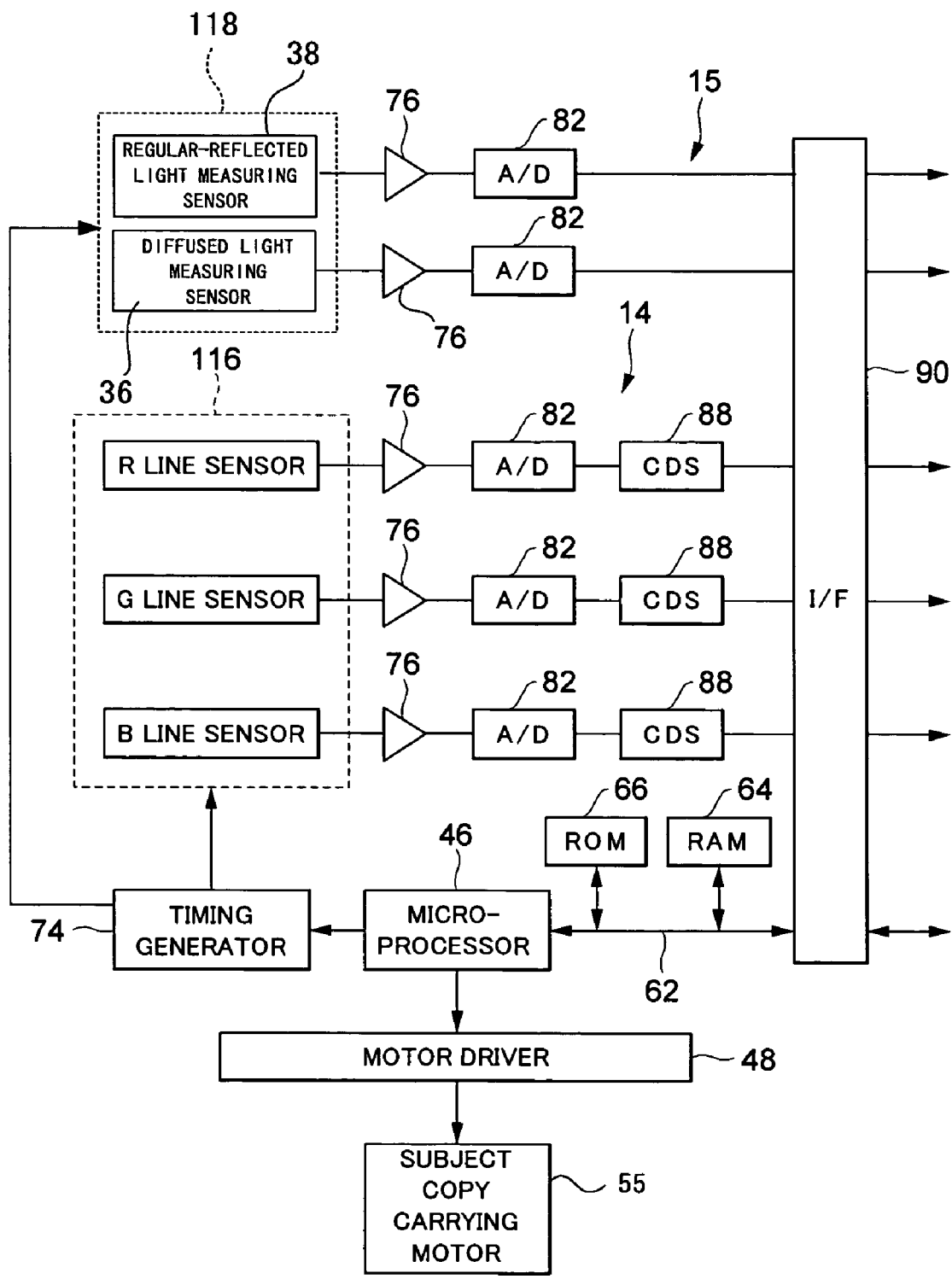
FIG. 7 roughly illustrates an example of the configuration of the electric system in the line CCD scanner and surface quality detecting sensor section.

FIG. 7 schematically shows the configuration of the electric system of the line CCD scanner 14 and the surface quality detecting sensor unit 15. These line CCD scanner 14 and surface quality detecting sensor unit 15 are provided with a microprocessor 46 taking charge of the overall control of the line CCD scanner 14 and the surface quality detecting sensor unit 15. To this microprocessor 46 are connected a RAM 64 (e.g. SRAM) and a ROM 66 (e.g. a rewritable ROM) via a bus 62 as well as a motor driver 48. To this motor driver 48 is connected a subject copy carrying motor 55. The subject copy is carried by this subject copy carrying motor 55 in a prescribed at a constant speed.

The microprocessor 46, interlocked with the turning on and off a power switch (not shown), turns on and off a power of the light source or sources 30.

On the other hand, a timing generator 74 is connected to the line CCD 116 and the surface quality detecting sensor 118. This timing generator 74 generates various timing signals (clock signals) for operating the line CCD 116, the surface quality detecting sensor 118 and an A/D converter 82 to be described afterwards. The signal output terminals of the line CCD 116 and the surface quality detecting sensor 118 are connected to the A/D converter 82 via an amplifier 76. Signals supplied from the line CCD 116 and the surface quality detecting sensor 118 are amplified by the amplifier 76, and converted into digital data by the A/D converter 82.

The output terminal of the A/D converter 82 is connected to an interface (I/F) circuit 90 via a correlative double sampling circuit (CDS) 88. This CDS 88 samples feedthrough data representing the levels of feedthrough signals and pixel data and surface quality data representing the levels of pixel signals, and subtracts feedthrough data from pixel data and surface quality data for each pixel. It then successively supplies the results of computation (pixel data accurately matching the accumulated charge in each CCD cell) to the image processing unit (the recorded image preparing means 16 and the surface quality determining means 17) via the I/F circuit 90 as image data for recording and surface quality data.

Incidentally, as R, G and B photometric signals, regular reflection luminous energy data, diffused luminous energy data are supplied in parallel from the line CCD 116 and the surface quality detecting sensor 118, there are also provided five signal processing lines each consisting of the amplifier 76, the A/D converter 82 and the CDS 88. From the I/F circuit 90 are supplied in parallel R, G and B image data as image data for recording and surface quality data and the surface quality data of regular reflection luminous energy and diffused luminous energy.

Figure 8:
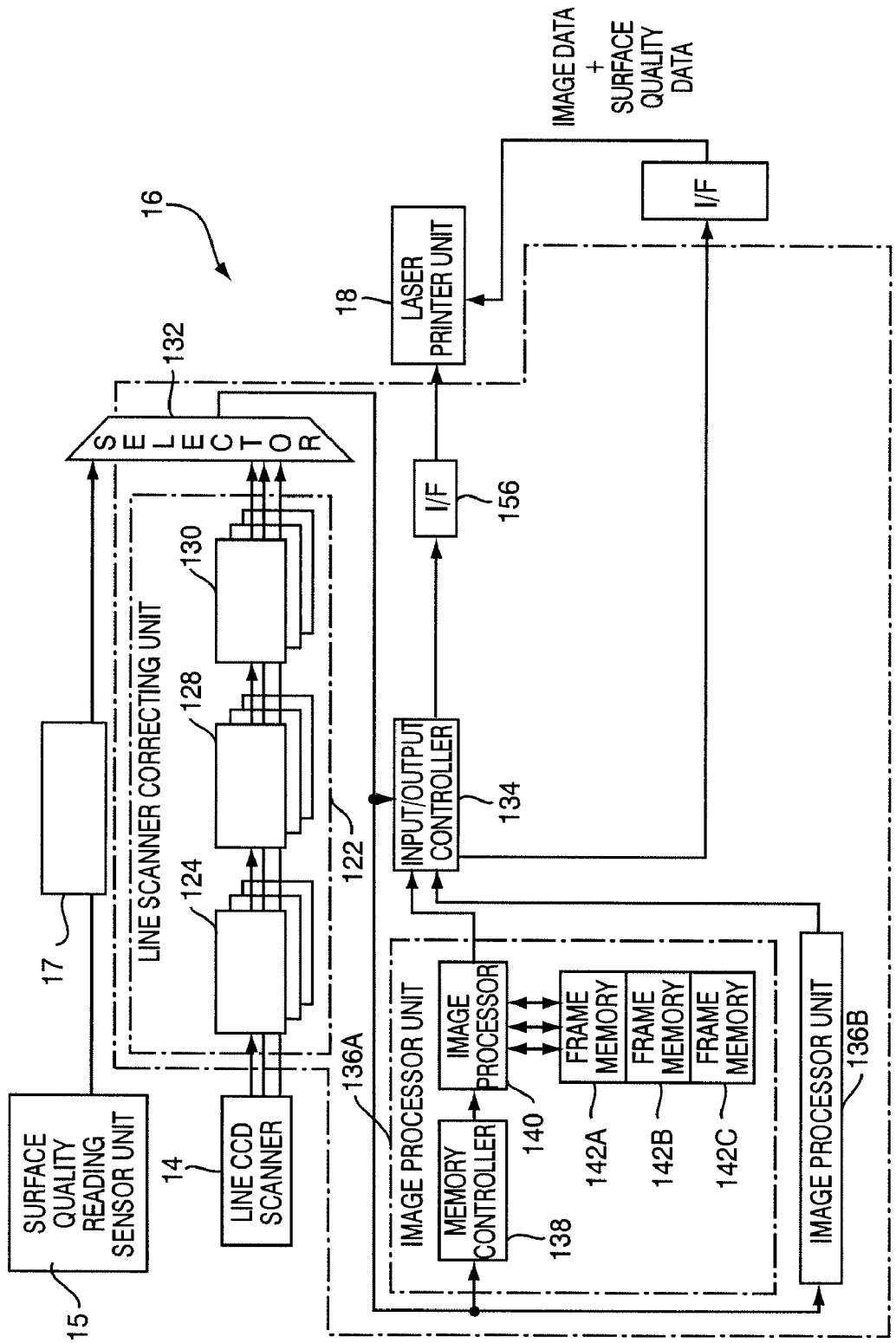
FIG. 8 illustrates an example of the configuration of the electric system in the image processing unit (recorded image preparing means and surface quality determining means).

Next will be described the configuration of the image processing unit (the recorded image preparing means and the surface quality determining means) with reference to FIG. 8. In this image processing unit (the recorded image preparing means 16 and the surface quality determining means 17), a line scanner correcting unit 122 is provided to match the line CCD scanner 14. This line scanner correcting unit 122 is provided with three signal processing lines, each consisting of a darkness correcting circuit 124, a defective pixel correcting unit 128 and a lightness correcting circuit 130, to match the R, G and B image data supplied in parallel from the line CCD scanner 14.

Further, the surface quality determining means 17 is provided to match the surface quality detecting sensor unit 15. This surface quality determining means 17 computes the ratio between the regular reflection luminous energy and the diffused luminous energy (regular reflection luminous energy/diffused luminous energy) from the regular reflection luminous energy data and the diffused luminous energy data supplied from the surface quality detecting sensor unit 15, and is connected to a surface quality determination level 19 (not shown) for determining the surface quality of the subject copy. In this surface quality determining means 17, the surface quality data are converted into surface quality determination data and supplied, and surface treatment is performed on the basis of these surface quality determination data by the processor unit to be described afterwards.

The darkness correcting circuit 124 stores on a cell-by-cell basis data entered from the line CCD scanner 14 (data representing the dark output level of each cell in the sensing units of the line CCD 116) in a state in which the light source of the line CCD 116 is off, and performs correction by subtracting the dark output level of the cell matching each cell from scan image data entered from the line CCD scanner 14.

The photoelectric conversion property of the line CCD 116 may fluctuate in density from cell to cell. In the lightness correcting circuit 130 at a stage subsequent to the defective pixel correcting unit 128, a gain is prescribed for each cell on the basis of image data on a subject copy for adjusting use, entered from the line CCD scanner 14 (fluctuations in density from pixel to pixel represented by these image data are due to fluctuations in photoelectric conversion property from cell to cell), by reading the subject copy for adjusting use with the line CCD 116 in a state in which the subject copy for adjusting use of which the whole frame is uniform in density is set on the line CCD scanner 14, and image data on the subject copy to be read, entered from the line CCD scanner 14, are corrected on a cell-by-cell basis according to the gain prescribed for each cell.

On the other hand, if the density of any specific pixel in the image data on the subject copy for adjusting use are significantly different from those of other pixels, the cell in the line CCD 116 matching the specific pixel must be abnormal in some respect or other, and the specific pixel can be assumed to be a defective pixel. The defective pixel correcting unit 128 stores the address of the defective pixel on the basis of the image data on the subject copy for adjusting use, complements the data on the image data out of the image data on the subject copy to be read, entered from the line CCD scanner 14, with pixel data in the surroundings, and thereby generates new data.

The output terminal of the line scanner correcting unit 122 and the output terminal of the surface quality determining means 17 are connected to the input terminal of a selector 132, and the image data supplied from this line scanner correcting unit 122 and the surface quality determination data supplied from surface quality determining means 17 are entered into the selector 132. The output terminal of the selector 132 is connected to the respective data input terminals of an input/output controller 134 and image processor units 136A and 136B. The selector 132 can selectively supply the entered image data and surface quality determination data to each of the input/output controller 134 and the image processor units 136A and 136B.

The image processor unit 136A is provided with a memory controller 138, an image processor 140 and four frame memories 142A, 142B, 142C and 142D (not shown). Each of the frame memories 142A, 142B, 142C and 142D (not shown) has a capacity to store a single-frame equivalent of image data on the subject copy, and image data and surface quality determination data entered from the selector 132 are stored in one of the four frame memories 142. The memory controller 138 controls the addresses used when the image data and surface quality determination data are stored into the frame memories 142 so that the data on the pixels of the entered image data and surface quality determination data be stored in a certain sequence in the storage areas of the frame memories 142.

The image processor 140 takes in the image data stored in the frame memories 142, and subjects them to various modes of image processing including gradation change, color conversion, hyper tone processing to compress the gradation range of the ultra-low frequency luminance components of images, and hyper sharpness processing to emphasize sharpness while suppressing granulation.

The image processor 140 is connected to the input/output controller 134. The image data for recording and surface quality determination data having undergone image processing, after being temporarily stored in the frame memories 142, are supplied to the input/output controller 134 at a prescribed timing. Incidentally, since the image processor unit 136B has the same configuration as the image processor unit 136A described above, its description will be dispensed with.

In this example of the present invention, the line CCD scanner 14 and the surface quality detecting sensor unit 15 read from individual subject copies. The image data and surface quality data thereby obtained are subjected to image processing and surface quality determination processing, and the resultant image data for recording and surface quality determination data are supplied from the selector 132 to the input/output controller 134 via the image processor units 136.

The input/output controller 134 is connected to the laser printer unit 18 via an I/F circuit 156. Where image data for recording and surface quality determination data having gone through image processing are to be used for the recording of an image on a recording photographic sheet, the image data for recording and surface quality determination data having gone through image processing by the image processor units 136 are supplied as image data for recording and surface quality determination data from the input/output controller 134 to the laser printer unit 18 via the I/F circuit 156.

Figure 9:
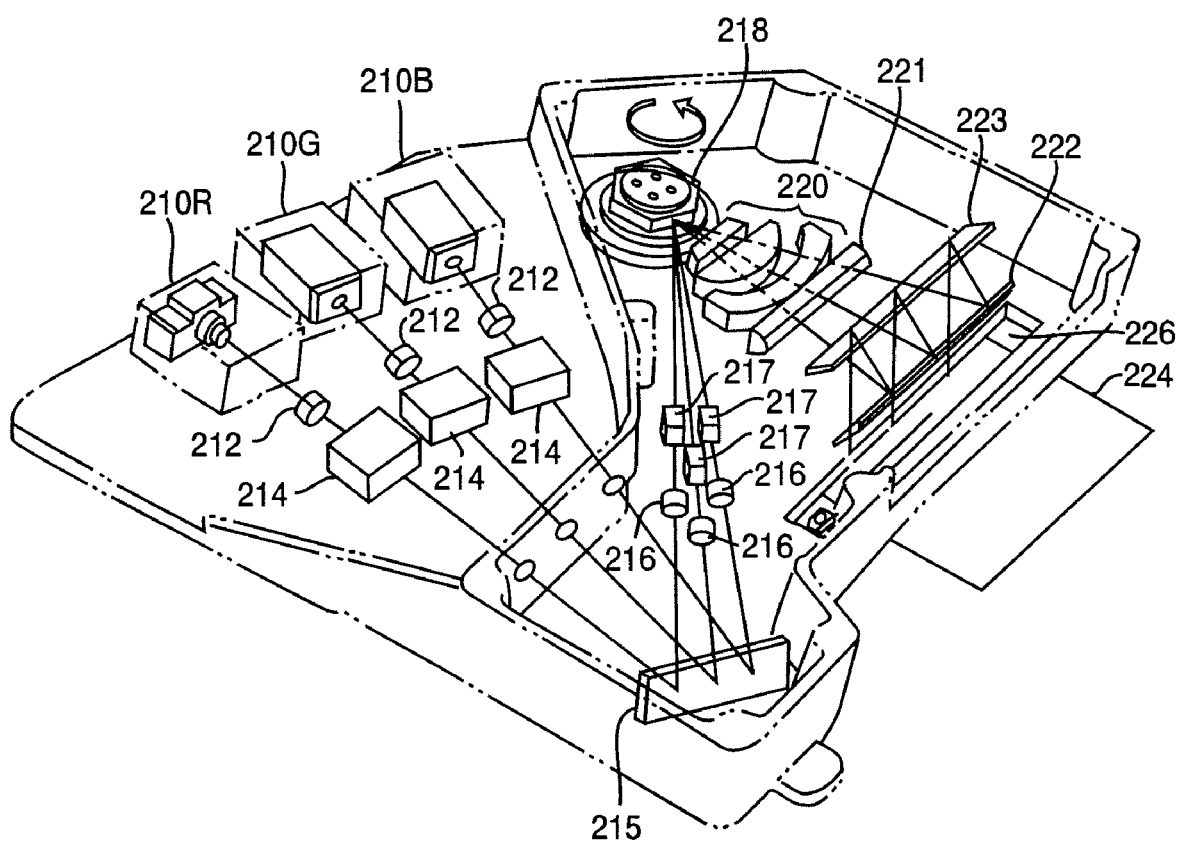
FIG. 9 illustrates an example of the configuration of the optical system of the laser printer unit.

Next will be described the configuration of the laser printer unit 18 and the processor unit 20. FIG. 9 shows the configuration of the optical system of the laser printer unit 18. The laser printer unit 18 is provided with three laser beam sources 210R, 210G and 210B as its light sources. The laser beam source 210R consists of a semiconductor laser (laser diode: LD) emitting a laser beam of a wavelength of R (e.g. 685 nm) (hereinafter referred to as the R laser beam). The laser beam source 210G consists of an LD and a wavelength conversion element (second harmonic generator: SHG) for converting the laser beam emitted from the LD into a laser beam of a ½ wavelength, and the oscillation wavelength of the LD is so set that a laser beam of a wavelength of G (e.g. 532 nm) (hereinafter referred to as the G laser beam) be emitted from the SHG. Similarly, the laser beam source 210B consists of an LD and an SHG, and the oscillation wavelength of the LD is so set that a laser beam of a wavelength of B (e.g. 473 nm) (hereinafter referred to as the B laser beam) be emitted from the SHG. Incidentally, solid lasers may as well be used in place of the LDs.

Figure 10:
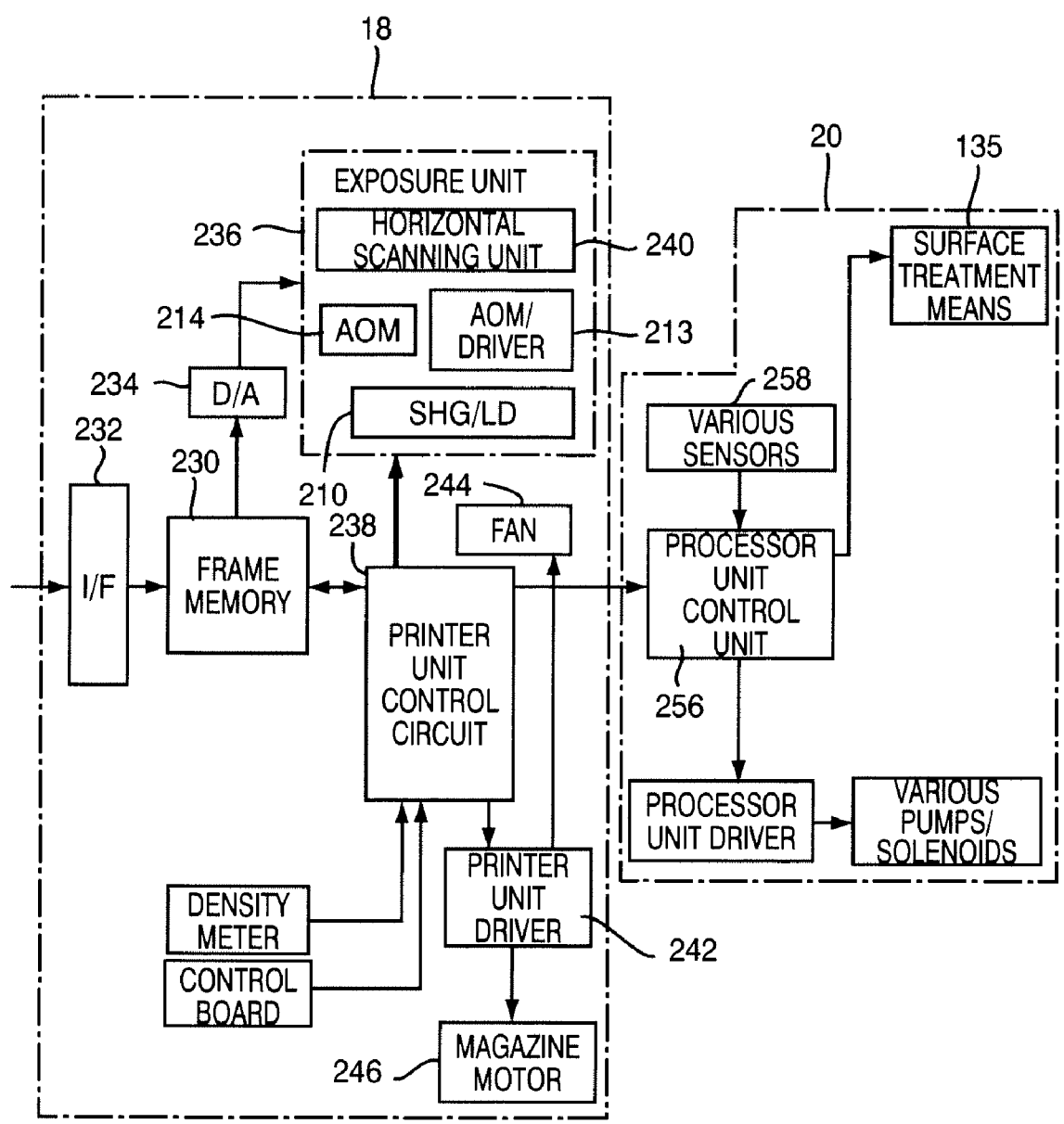
FIG. 10 roughly illustrates an example of the configuration of the electric system in the laser printer unit and the processor unit.

On the laser beam emitting side of each of the laser beam sources 210R, 210G and 210B are arranged a collimator lens 212 and an acoustooptical modulation element (AOM) 214 as modulation means in that sequence. Each of the AOMs 214 is so arranged that the incident laser beam be transmitted by an acoustooptical medium, and is connected to an AOM driver 213 as shown in FIG. 10. When a high frequency signal is entered from the AOM driver 213, an ultrasonic wave matching the high frequency signal propagates in the acoustooptical medium, an acoustooptical effect works on the laser beam transmitted by the acoustooptical medium to give rise to diffraction, and a laser beam of an intensity matching the amplitude of the high frequency signal is emitted from the AOM 214 as diffracted light.

On the diffracted light emitting side of each of the AOM 214 is arranged a plane mirror 215, and on the laser beam emitting side of the plane mirror 215 are sequentially arranged a spherical lens 216, a cylindrical lens 217 and a polygon mirror 218 as deflecting means. The R laser beam, G laser beam and B laser beam emitted from the respective AOMs 214 as diffracted lights, after being reflected by the plane mirror 215, irradiate substantially the same position on the reflective face of the polygon mirror 218 via the spherical lens 216 and the cylindrical lens 217, and are reflected by the polygon mirror 218.

On the laser beam emitting side of the polygon mirror 218 are sequentially arranged an fθ lens 220 as the scanning lens, a cylindrical lens 221 for optical face tangle error correction use, having power in the vertical scanning direction, and a cylindrical mirror 222. Further on the laser beam emitting side of the cylindrical mirror 222 のlaser beam is arranged a folded mirror 223.

The three laser beams reflected by the polygon mirror 218 are sequentially transmitted by the fθ lens 220 and the cylindrical lens 221 and, after being reflected by the cylindrical mirror 222, are reflected downward by the folded mirror 223 in a substantially perpendicular direction to irradiate a photographic sheet 224 via an opening 226. Incidentally, the folded mirror 223 may be dispensed with, and the beams may be directly reflected downward by the cylindrical mirror 222 in a substantially perpendicular direction to irradiate the photographic sheet 224.

FIG. 10 roughly illustrates the configuration of the electric system in the laser printer unit 18 and the processor unit 20. This laser printer unit 18 is provided with a frame memory 230 for storing image data for recording and surface quality determination data. The frame memory 230 is connected to the image processing unit (the recorded image preparing means 16 and the surface quality determining means 17) via an I/F circuit 232, and image data for recording (image data representing the R, G and B densities of each pixel of the image to be recorded on the photographic sheet 224) and surface quality determination data entered from the image processing unit (the recorded image preparing means 16 and the surface quality determining means 17) are temporarily stored in the frame memory 230 via the I/F circuit 232. The frame memory 230 is connected to an exposure unit 236 via a D/A converter 234, and is also connected to a printer unit control circuit 238.

The exposure unit 236, as stated above, is provided with laser beam sources 210 each consisting of an LD (and SHG), and also has three lines each of the AOM 214 and the AOM driver 213. It is further provided with the polygon mirror 218 and a horizontal scanning unit 240 having a motor to turn the polygon mirror 218. The exposure unit 236 is connected to the printer unit control circuit 238, which controls the operations of various units.

On the other hand, as shown in FIG. 10, a printer unit driver 242 is connected to the printer unit control circuit 238, and to the printer unit driver 242 are connected a fan 244 for blowing air to the exposure unit 236 and a magazine motor 246 for drawing photographic paper out of a magazine loaded in the laser printer unit. A processor unit control circuit 256 for controlling the processor unit 20 is further connected to the printer unit control circuit 238.

To the processor unit control circuit 256 are connected various sensors 258 for detecting the passage of a photographic sheet carried on a photographic paper carriage path within the body of the processor unit 20 and the surface levels of various treatment solutions deposited in processing tanks and surface treatment means 135. Their operations are controlled by the processor unit control circuit 256.

The surface treatment means 135 is so designed as to subject a sheet (image recording medium) on which an image has been formed by the laser printer unit 18 to prescribed surface treatment on the basis of surface quality determination data from the processor unit control circuit 256.

Figure 11:
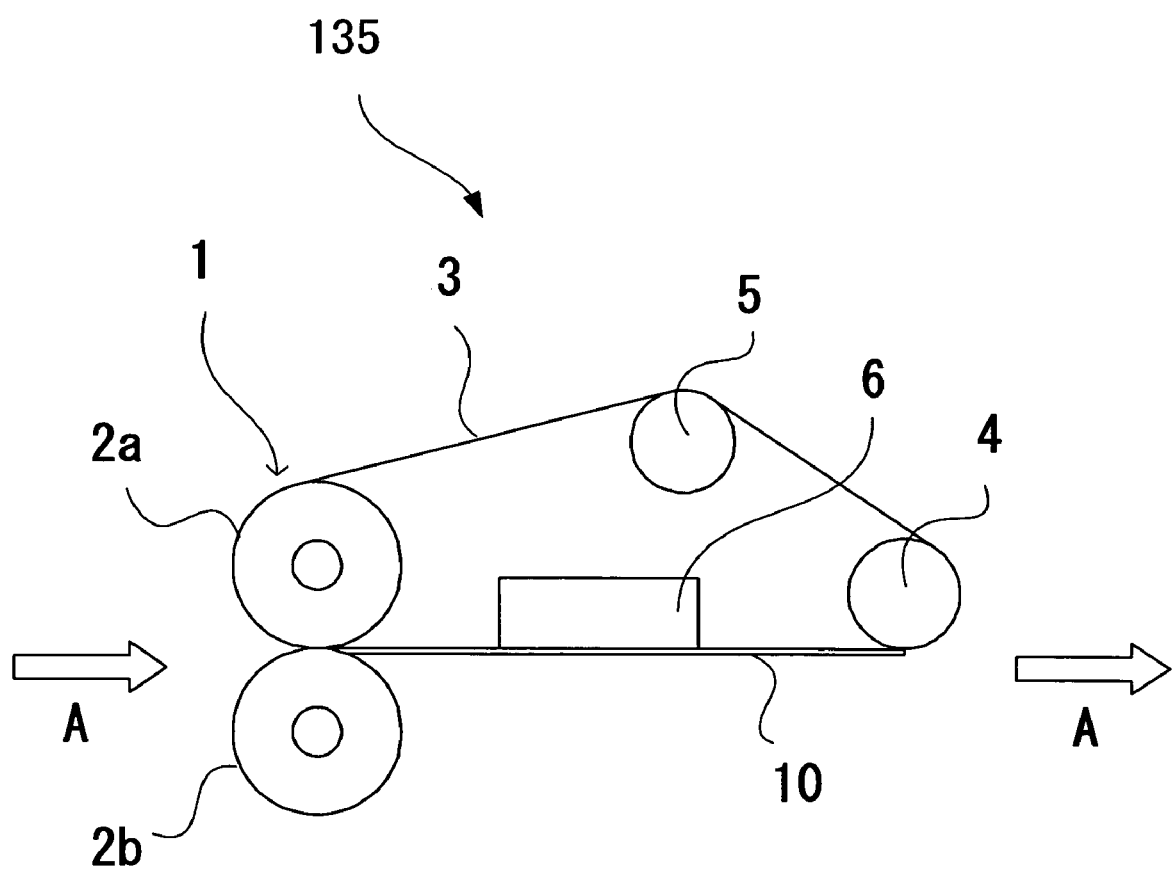
FIG. 11 roughly illustrates the configuration of an example of surface treatment device according to the present invention.

The surface treatment means 135 in this example, as shown in FIG. 11, has sheet heating means 1, sheet cooling means 6 and control means (not shown).

The sheet heating means 1 has a pair of heating rollers 2a and 2b and an endless belt 3.

The heating rollers 2a and 2b, having built-in heaters, are designed to be able to control the temperature as desired. The heating roller 2a is arranged inside the endless belt 3 to be rotatable in contact with the inside of the endless belt 3. The heating rollers 2b are arranged outside the endless belt 3 to be rotatable in contact with the outside of the endless belt 3 so as to press the heating rollers 2a.

The endless belt 3, finished to a mirror surface, is kept tense by the heating roller 2a, a rotation roller 4 and a tension roller 5 arranged inside the endless belt 3. The rotation roller 4 can shift in the carrying direction A. The tension roller 5 can shift vertically when a face stretched between the heating roller 2a and the rotation roller 4 in the endless belt 3 is positioned as the bottom face.

The sheet cooling means 6 is a cooling device with an air blowing function in this example, and is arranged inside the endless belt 3 between the heating roller 2a and the rotation roller 4.

This surface treatment means 135, when driven at the beginning, carries a sheet 10 to be treated within the surface treatment means and shifts it, and inserts into a nip formed between the pair of heating rollers 2a and 2b. Incidentally, the carriage of the sheet to this point can be accomplished with conveyor rollers or a conveyor belt, and this example is designed to carry it with conveyor rollers. The sheet 10 inserted into the nip is kept in contact with the surface of the endless belt 3 turning interlocked with the rotation of the pair of heating rollers 2a and 2b. The rotation roller 4 and the tension roller 5 may rotate either interlocked with the turning of the endless belt 3 (freely rotatable) or may be designed so that they are rotationally driven and turn the endless belt 3 together with the pair of heating rollers 2a and 2b. In this example, the rotation roller 4 and the tension roller 5 are designed to fit the former description.

At this time, as shown in FIG. 11, the heating rollers 2a and 2b are heated to a temperature at which thermoplastic resin layers in the sheet 10 (in this example, the sheet is electrophotographic paper and the thermoplastic resin layers are layers provided on both faces of the supporting base (polyethylene resin layers) and image receiving layers arranged over those layers) can be softened, and the sheet 10 inserted into the nip is heated in that nip to a temperature at which the thermoplastic resin layers become softened to be deformable. Then in the nip, the thermoplastic resin layers are softened and become deformable. As the nip is pressed by the pressing force of the heating roller 2b, both faces of the sheet 10 are pressed when it passes the nip. The thermoplastic resin layer which is the softest in the sheet 10 then is deformed while being pressed by the pair of heating rollers, and both faces of the sheet 10 are smoothened. Also, the pressure of the nip then causes the sheet 10 to pass the nip while being kept in tight adhesion to the surface of the endless belt 3, and is carried in the carrying direction A.

Next, the sheet 10 is cooled by a cooling device 6 while being kept in tight adhesion to the surface of the endless belt 3, and its thermoplastic resin layers are hardened. Then it is carried as it is to the position of the rotation roller 4. As the carrying direction A of the endless belt 3 changes by 90 degrees or even more in the position of the rotation roller 4, the sheet 10 is peeled off the surface of the endless belt 3 whose carrying direction varies abruptly. The sheet 10 peeled off the endless belt 3 continues to be carried by the conveyor rollers (not shown) and the like in the carrying direction A, and discharged into a discharge tray (not shown). The surface quality of the endless belt 3 (contact member) is transferred to the interface of the thermoplastic resin layers and the surface of the image forming layer of the sheet 10 thereby obtained is finished to a mirror plane and becomes highly glossy.

Incidentally, the surface treatment means of this example, as shown in FIG. 10, controls on the basis of surface quality determination data supplied from the processor unit control circuit 256 the operating conditions of various means, the surface quality of the contact member, for instance the heating temperature of the pair of heating rollers 2a and 2b (preferably the temperature should be raises when the sheet 10 is thicker), the nip pressure (preferably it should be constant even if the sheet 10 becomes thicker), the carrying speed of the endless belt (preferably it should be slower when the endless belt 3 is not sufficiently heated or the cooling by the cooling device 6 is insufficient), the cool air flow rate from the cooling device 6, the distance between the heating roller 2a and the rotation roller 4 (preferably it should be longer when the treatable face of the sheet 10 is to be glossy and shorter when the face is to be matte), and the setting of the surface quality of the contact member to gloss, matte or embossment. In this example, the CPU functions as the surface quality control means. Since the CPU can appropriately alter the operating conditions of various means in the surface treatment means, sheets manifesting the desired surface quality can be provided by the surface treatment means under the optimal conditions.

Figure 12:
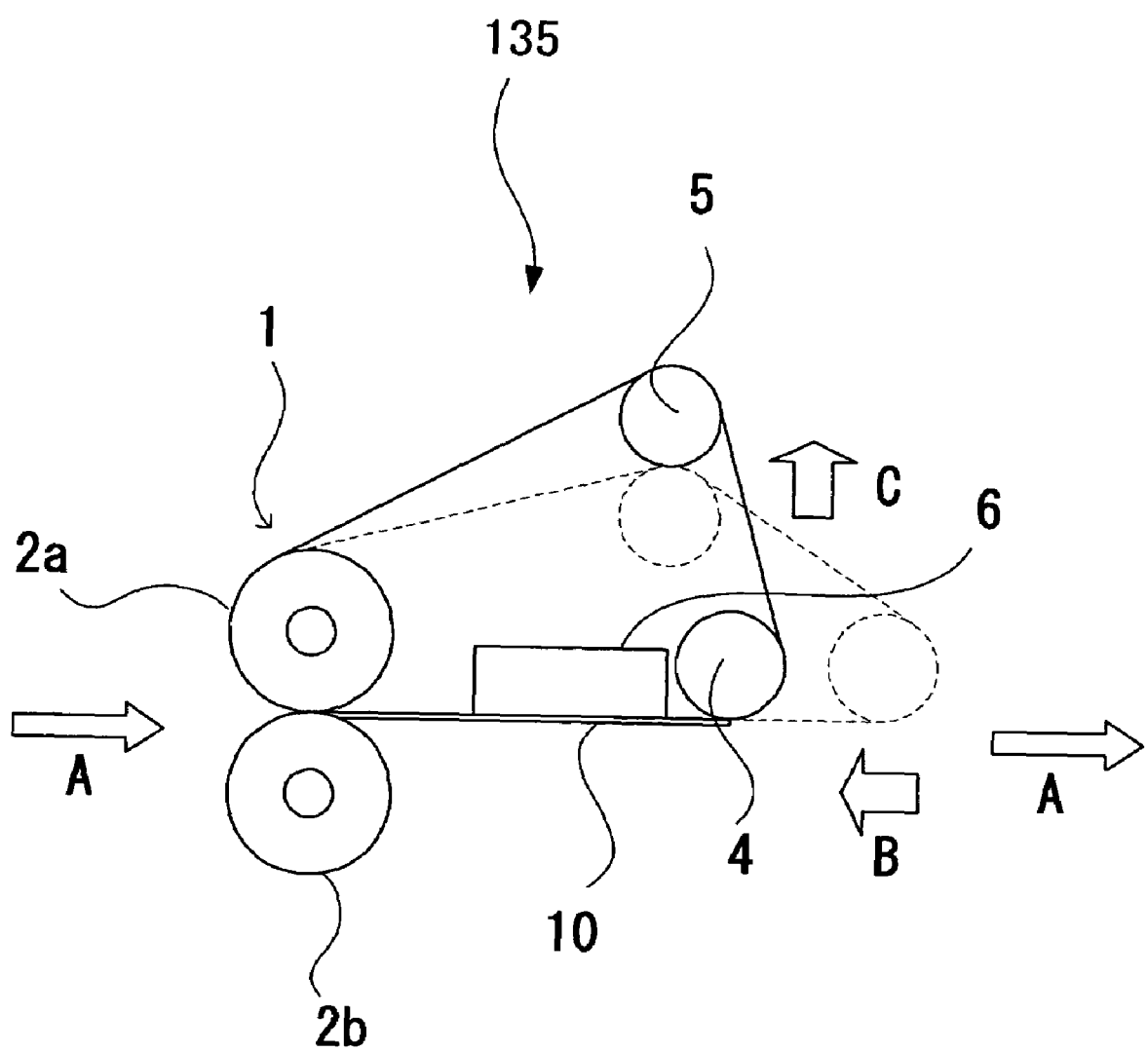
FIG. 12 roughly illustrates the configuration of an example of control of cooling conditions in the surface treatment device according to the present invention.

For instance, as shown in FIG. 12, the CPU may shorten the distance between the heating roller 2a and the rotation roller 4 by shifting the rotation roller 4 toward the heating roller 2a (in the direction of arrow B). Then, the tension of the endless belt 3 would be insufficient as it is. However, as the tension roller 5 also shift upward (arrow C), the endless belt 3 can keep an appropriate level of tension. When the distance between the heating rollers 2a and the rotation roller 4, the sheet 10 carried while being kept in contact with the surface of the endless belt 3 will take less time to be cooled by the cooling device 6.

EXAMPLE 2

Figure 13:
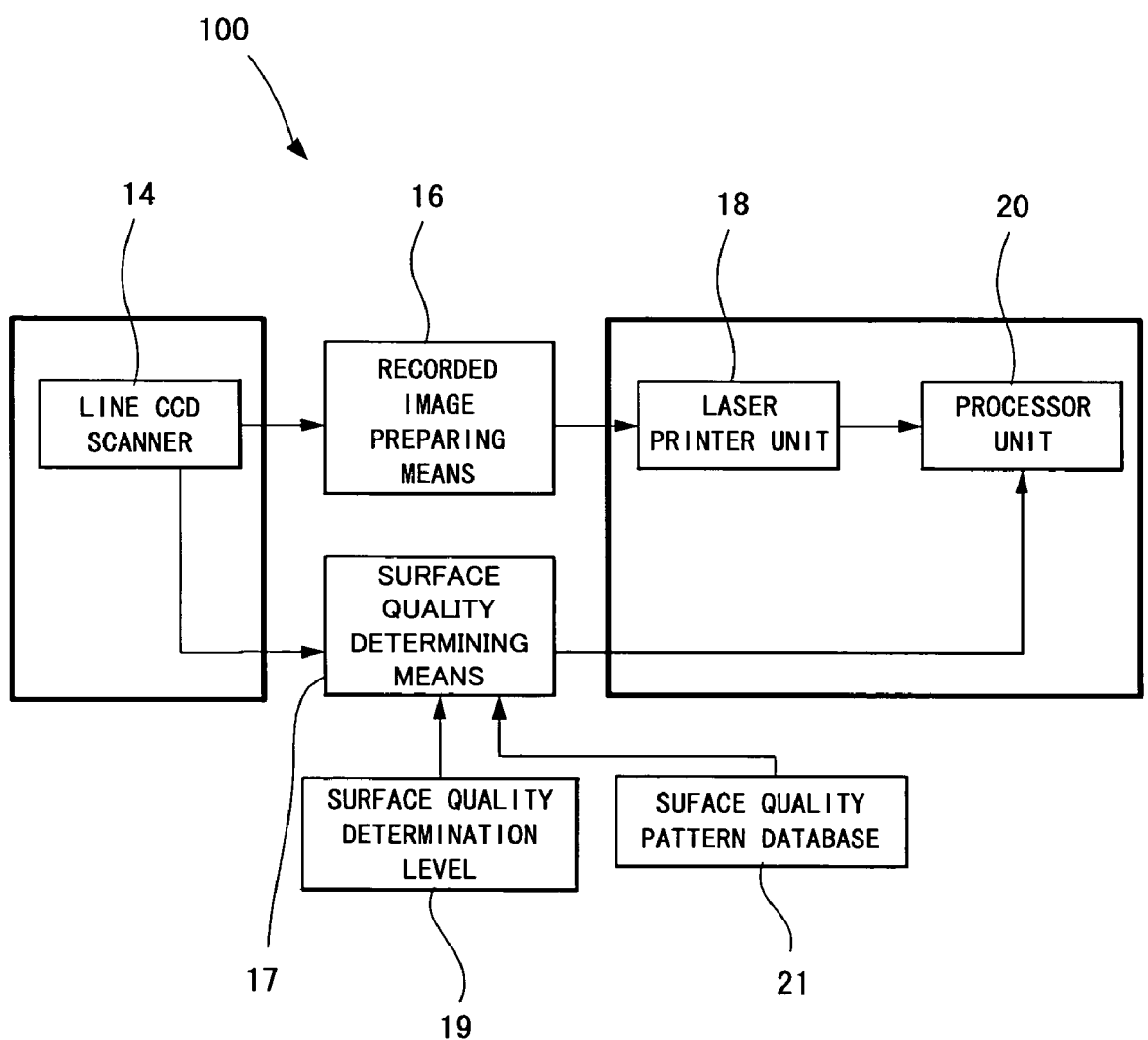
FIG. 13 schematically illustrates an example of an image forming apparatus, which is Example 2 of the present invention.

The image forming apparatus in Example 1 is altered to an image forming apparatus 100 shown in FIG. 13. In this example, the line CCD scanner 14 is provided as the image reading unit, and this line CCD scanner 14 simultaneously reads image information and surface quality from a subject copy, and supplies image data and surface quality data.

Further in this example, the surface quality determining means 17 can prepare surface quality determination data by using the surface quality determination level 19 and a surface quality pattern database 21. Determination of surface quality by the combined use of the surface quality determination level 19 and the surface quality pattern database 21 makes possible even more precise determination of surface quality.

In this Example 2 too, as in Example 1, an image including its surface quality can be readily and efficiently reproduced by reading image information and surface quality on the subject copy and adjusting the operating conditions of various means, the surface quality of the contact member, the heating temperature of the pair of heating rollers, the carrying speed of the endless belt, the cool air flow rate of the cooling device, and the distance between the heating rollers and the rotation roller.

EXAMPLE 3

Figure 14A:
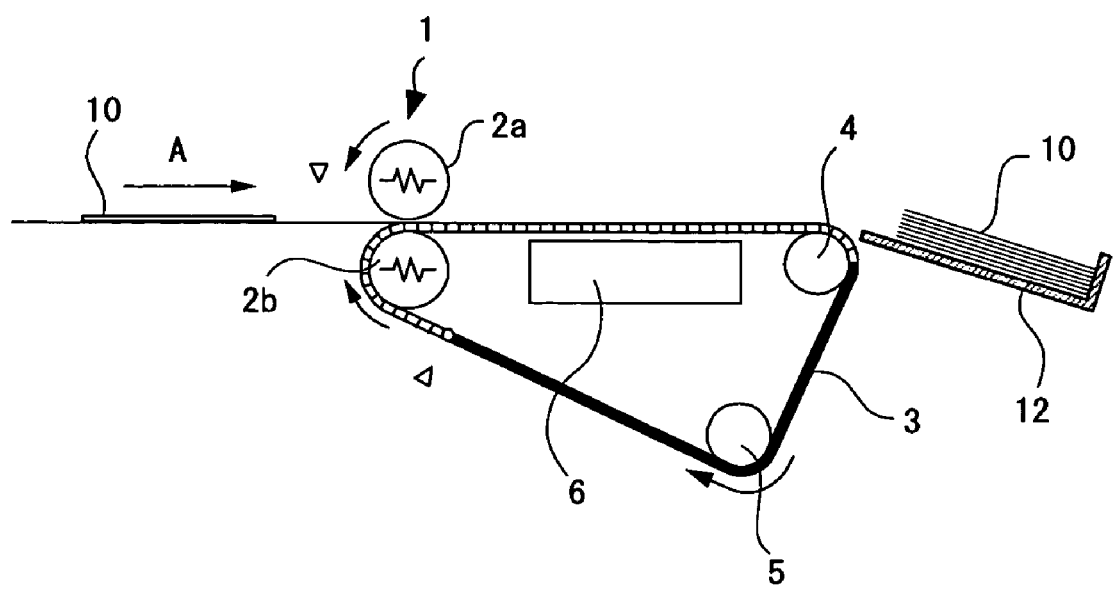
FIGS. 14A, 14B and 14C roughly illustrate an example of surface treatment means, which is Example 3 of the present invention.
Figure 14B:
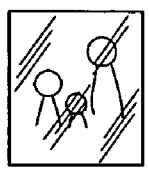
Figure 14B:
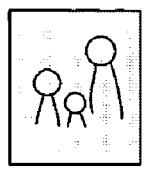
Figure 14B:
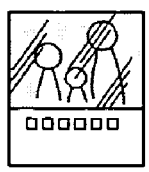
Figure 14C:
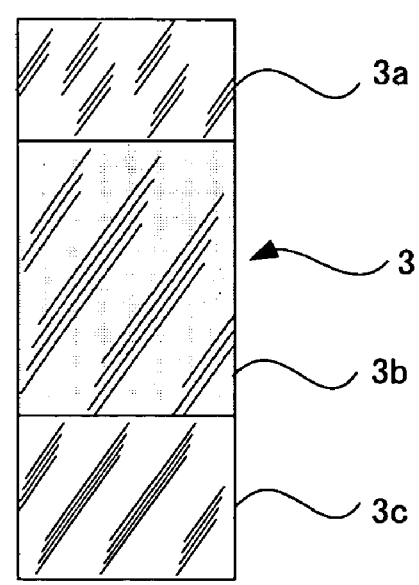

In an image forming apparatus, which is Example 3, the surface treatment means 135 in Example 1 is replaced with the surface treatment means shown in FIG. 14A. In this FIG. 14A surface treatment means as shown in FIG. 14C, the endless belt is configured by linking a plurality of contact member meeting units matching the size of the sheet (a digital color photograph of the size of a regular postcard) 10. There are three kinds of the contact member meeting units, including part 3a which is wholly glossy, part 3b which is wholly matte and part 3c which is partly glossy and partly matte.

The endless belt 3, as shown in FIG. 14A, is kept tense by the heating roller 2b, the rotation roller 4 and the tension roller 5, both arranged inside the endless belt 3.

In this surface treatment means, when driven at the beginning, carries a treatable sheet (a digital color photograph of the size of a regular postcard) 10 from a discharge tray in the image forming apparatus into the surface treatment device, and causes it to be carried in the carrying direction A. Incidentally, the carriage of the sheet to this point can be accomplished with conveyor rollers or a conveyor belt, and this example is designed to carry it with a conveyor belt. Then on the basis of detection information from an aligning sensor arranged slightly upstream from a nip formed between the pair of heating rollers 2a and 2b and an aligning sensor arranged in the vicinity of the surface of the endless belt 3 and in the vicinity of the surface of the heating roller 2b, the control means adjusts the turning speed of the endless belt 3 and the carrying speed of the sheet (a digital color photograph of the size of a regular postcard) 10, and alignment is performed not to let the contact member meeting units of the endless belt 3 and the sheet (a digital color photograph of the size of a regular postcard) 10 be misaligned. Next, on the basis of surface quality determination data supplied from the processor unit control circuit 256, the position of the contact member is selected (the contact member is turned forward or backward and kept standing by in a proper position), and the sheet (a digital color photograph of the size of a regular postcard) 10 is inserted into the nip formed between the pair of heating rollers 2a and 2b. The sheet (a digital color photograph of the size of a regular postcard) 10 inserted into the nip is kept in contact with the surface of the endless belt 3 turning interlocked with the rotation of the pair of heating rollers 2a and 2b. The rotation roller 4 and the tension roller 5 may rotate either interlocked with the turning of the endless belt 3 or designed to be rotationally driven to be able to turn the endless belt 3 together with the pair of heating rollers 2a and 2b. In this example, the rotation roller 4 and the tension roller 5 are designed to fit the former description.

By this point of time, the heating rollers 2a and 2b are already heated to a high enough temperature to soften the thermoplastic resin layers (to which the polyethylene resin layer coating a digital color photograph of the size of a regular postcard corresponds in Example 1) of the sheet 10 shown in FIG. 1, and the sheet 10 inserted into the nip is heated in that nip to a temperature at which the thermoplastic resin layers become softened to be deformable. Then in the nip, the thermoplastic resin layers are softened and become deformable. As the nip is pressed by the pressing force of the heating roller 2a, the sheet 10 passes the nip in a state of overlapping the endless belt 3 in a prescribed position while being kept under pressure. The thermoplastic resin layer which is the softest in the sheet 10 then is deformed while being pressed by the pair of heating rollers, and the surface quality of the endless belt 3 is transferred to the surface of the sheet 10. The sheet 10 passes the nip while being kept in tight adhesion to the surface of the endless belt 3, and is carried in the carrying direction A.

Next, the sheet 10 is cooled by a cooling device 6 while being kept in tight adhesion to the surface of the endless belt 3, and its thermoplastic resin layers are hardened. Then it is carried as it is to the position of the rotation roller 4. As the carrying direction A of the endless belt 3 changes by 90 degrees or even more in the position of the rotation roller 4, the sheet 10 is peeled off the surface of the endless belt 3 whose carrying direction varies abruptly. The sheet 10 peeled off the endless belt 3 is accommodated on a tray 12.

The same image and surface quality as on the read subject copy is transferred by the endless belt 3 to the surface of the sheet 10 thereby obtained. As shown in FIG. 14B, if a photographic image is formed all over, the whole frame will be finished to a mirror surface and made glossy or matte, of if part of the frame contains character information or a blank, only the part where the photographic image is formed will be finished to a mirror surface and made matte. Incidentally, the matte part will prove easy to write on.

In this Example 3, instead of the sensor to detect the regular-reflected light/diffused light, a CCD sensor may be used, and in that case a luminous flux would irradiate the subject copy in an oblique direction, shades due to the embossment would be detected by the CCD sensor as surface quality data on the subject copy, and surface quality determination data would be prepared on that basis.

On the basis of the surface quality determination data thereby obtained, the position of a belt whose surface is embossed could be selected or a surface quality assigning device of a dot impact type could be operated to give the sheet the same embossment as that on the subject copy.

When reading an embossed image subject copy, at the time of reading image data, the subject copy should be irradiated with luminous fluxes from both right and left not to let shades be cast. On the other hand, at the time of reading the embossment, the subject copy should be irradiated with a luminous flux from only one side, right or left, to cause shades to be cast. Therefore, for more effective reading of an embossed image subject copy, the light sources 30 are arranged on both the right and left sides (not shown) as shown in FIG. 6.

EXAMPLE 4

Figure 15:
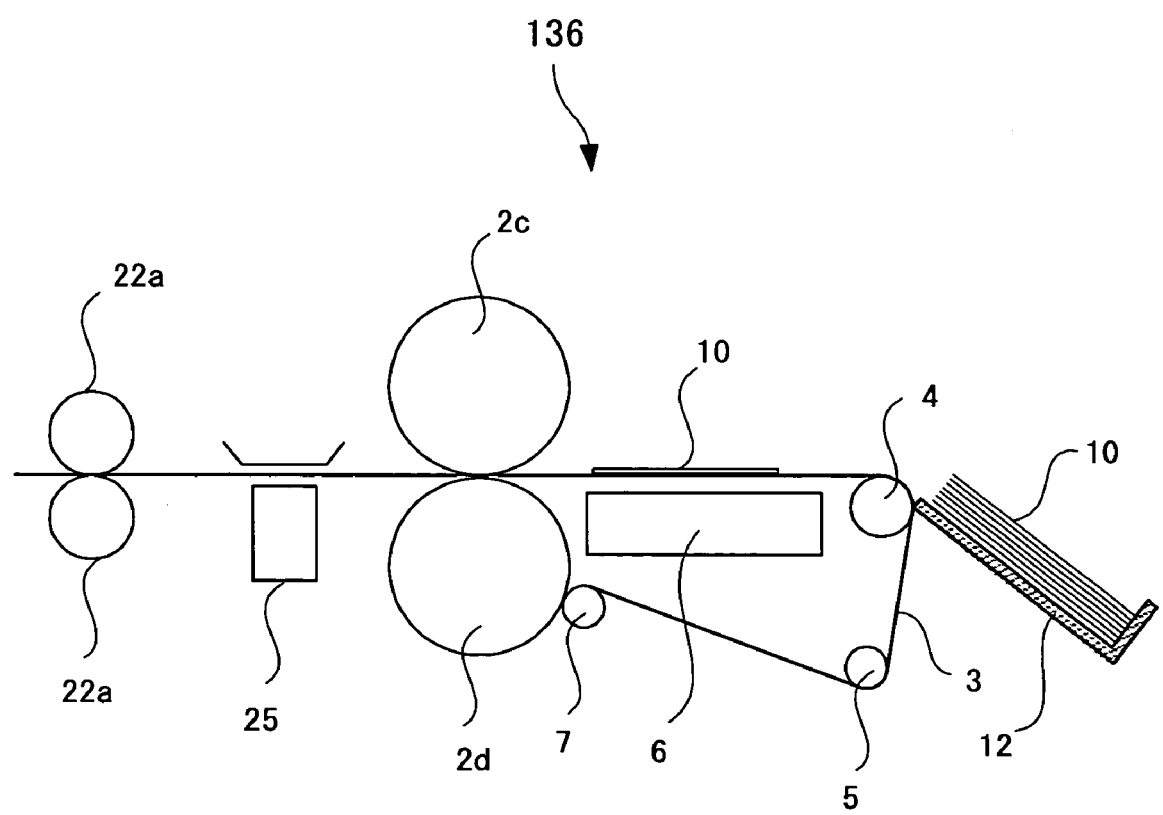
FIG. 15 roughly illustrates an example of surface treatment means, which is Example 4 of the present invention.

In an image forming apparatus, which is Example 4, as shown in FIG. 15, the counterpart to the surface treatment means 136 in Example 3 does not use any contact member, the pair of heating rollers 2a and 2b are replaced with a pair of pressure rollers 2c and 2d, a thermal head 25 capable of heating along the image shape is arranged upstream from the pair of pressure rollers 2c and 2d on the carriage path, and preheating rollers 22a consisting of a pair of heating rollers are arranged farther upstream on the carriage path. In other respects and except the arrangement of a rotation roller 7 positioned in the vicinity of the pressure roller 2d and being rotatably in contact with the outside of the endless belt 3, Example 4 is the same as Example 3.

Figure 16:
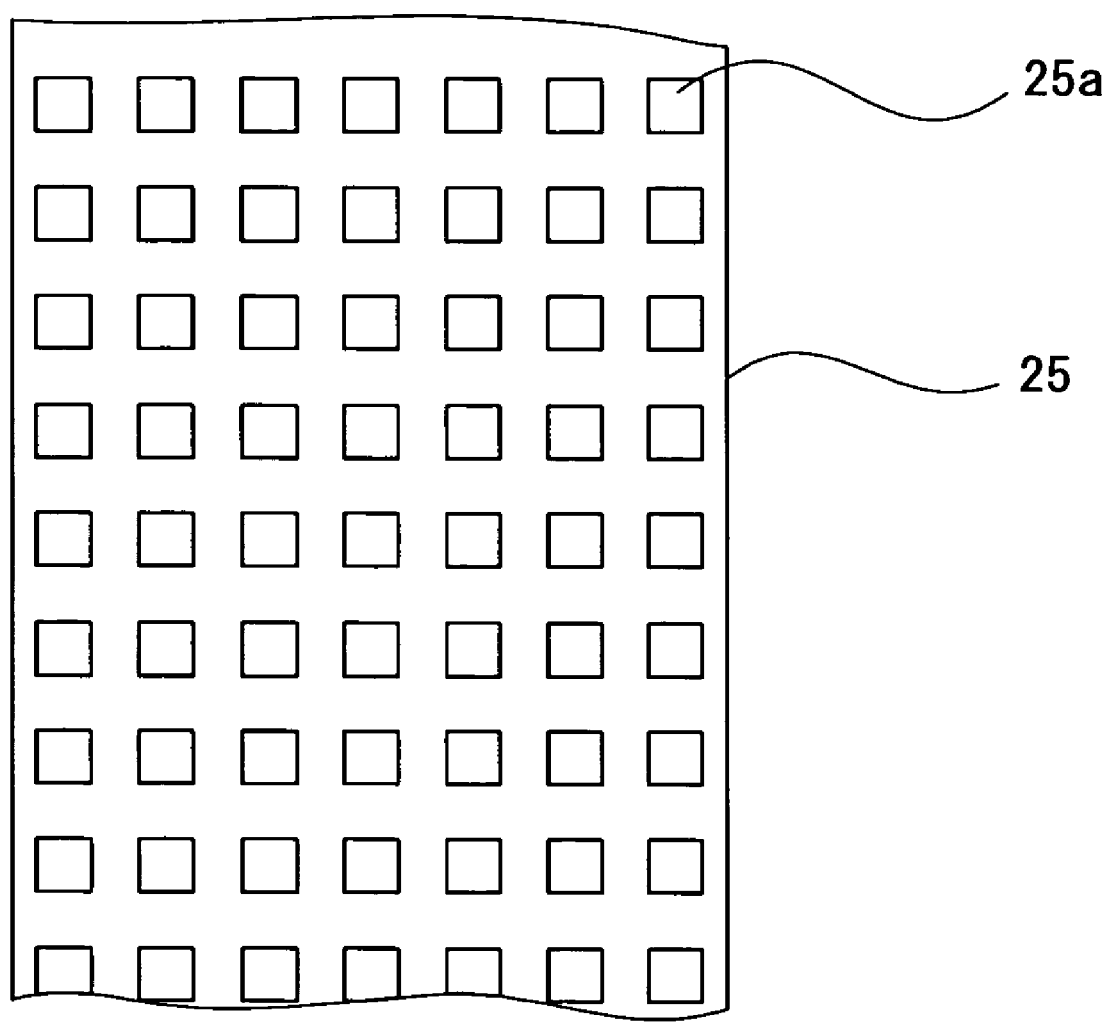
FIG. 16 illustrates an example of thermal head.
Figure 17:
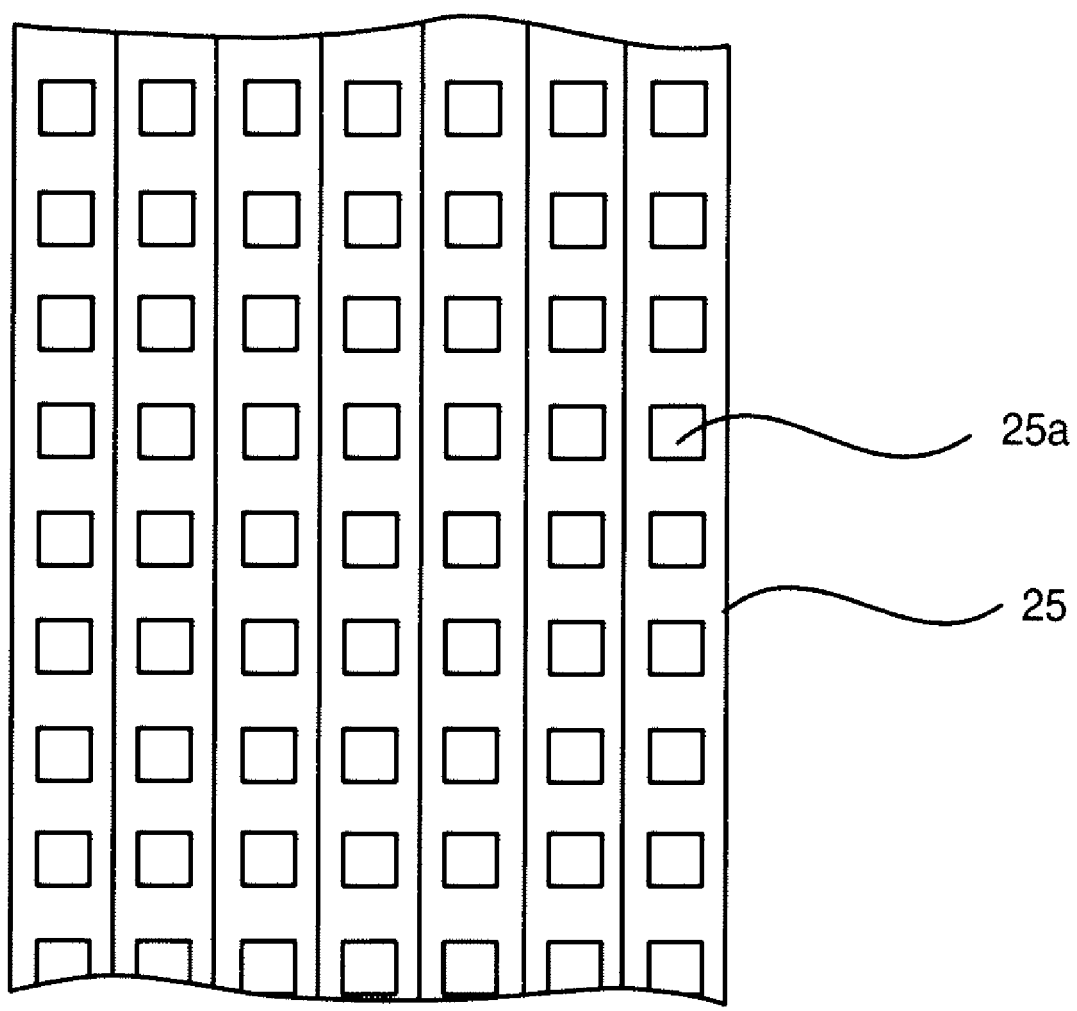
FIG. 17 illustrates another example of thermal head.

In this Example 4, while the thermal head 25 consists of heating elements 25a regularly arrayed vertically and horizontally as shown in FIG. 16, a plurality of lines of heating elements 25a can as well be arrayed side by side as shown in FIG. 17.

The heating elements 25a in the thermal head 25 are so designed that, on the basis of surface quality determination data supplied from the processor unit control circuit 256 in advance to provide information on an image for heating in the image shape, only those of the heating elements 25a in prescribed positions usable for forming the image are driven by a heating element driver for driving individual heating elements 25a, and heating is accomplished accordingly. For this reason, the sheet 10 is heated by the thermal head 25 to have the same image and surface quality as the read subject copy.

In Example 4, as the sheet 10 is heated by the thermal head 25, which is small in thermal capacity and limited in heating duration, there are provided the preheating rollers 22a with a view to preventing insufficient heating. Since the sheet 10 is sufficiently heated by the preheating rollers 22a, the thermoplastic resin layers in the sheet 10 subsequently heated again by the thermal head 25 are readily softened and melted by the heat of the thermal head 25. Then, the sheet (a greeting postcard in part of which a digital color photographic image is formed with character information printed underneath) 10 is heated by the thermal head 25 heats only in that part of the photographic image (heated along the image shape). The treatable face of the sheet 10 heated along the image shape is glossy only in the heated part. As a result, the photographic image part of the sheet 10 is made glossy, and the rest remains matte. The matte part is easy to write on.

Incidentally, although only the photographic image part is supposed to be heated by the thermal head 25 in this Example 4, conversely it is also possible to heat only the other part than the photographic image part, i.e. the non-photographic image part.

In this Example 4, instead of the sensor to detect the regular-reflected light/diffused light, a CCD sensor may be used, and in that case a luminous flux would irradiate the subject copy in an oblique direction, shades due to the embossment would be detected by the CCD sensor, surface quality data on the subject copy would be thereby detected, and surface quality determination data would be prepared on that basis. On the basis of the surface quality determination data so obtained, a surface quality assigning device of a dot impact type could be operated to give the sheet the same embossment as that on the subject copy.

When reading an embossed image subject copy, at the time of reading image data, the subject copy should be irradiated with luminous fluxes from both right and left not to let shades be cast. On the other hand, at the time of reading the embossment, the subject copy should be irradiated with a luminous flux from only one side, right or left, to cause shades to be cast. Therefore, for more effective reading of an embossed image subject copy, the light sources 30 are arranged on both the right and left sides (not shown) as shown in FIG. 6.

While the image forming apparatus embodying the present invention has hitherto been described in detail, the present invention is not limited to these examples, but can be modified in various ways without deviating from the essentials thereof.

According to the present invention, an image forming apparatus capable of reading image information and surface quality from a subject copy and readily and efficiently reproducing images including surface quality on a type of sheet selected from inkjet sheet, thermosensitive recording sheet, heat developing sheet, electrophotographic sheet and silver halide photographic sheet can be provided.

What is claimed is:

1. An image forming apparatus, comprising:
   an image reading unit which reads image information and surface quality from a subject and supplies image data and surface quality data;
   an image processing unit comprising a recorded image preparing means for preparing an image data for recording based on the image data and a surface quality determining means for determining the surface quality of the subject copy from the surface quality data and preparing surface quality determination data; and
   an image output unit having an image forming means for forming an image on a sheet based on the image data for recording and a surface treatment means for performing surface treatment on the sheet based on the surface quality determination data,
   wherein the surface treatment means comprises
   a sheet heating means having a contact member in the form of a sheet, the sheet heating means heating the sheet while a surface of the sheet is in contact with the contact member; and
   a sheet cooling means for cooling the sheet while being kept in contact with the contact member.

2. The image forming apparatus according to claim 1, wherein the image recording unit comprises one of a CCD sensor and a CMOS sensor capable of reading image information and surface quality from the subject copy.

3. The image forming apparatus according to claim 1, wherein the image recording unit comprises:

an image reading means which reads image information on the subject copy and supplies the image data, and a surface quality reading means which reads the surface quality of the subject copy and supplies the surface quality data.

4. The image forming apparatus according to claim 3, wherein the surface quality reading means has a surface quality detecting sensor which detects the surface quality of the subject copy.

5. The image forming apparatus according to claim 4, further comprising a light source, wherein the surface quality detecting sensor causes the light source to irradiate the subject copy with light, measures luminous energy of mirror reflection as regular reflection and luminous energy of diffusion from the subject copy, and detects the ratio between the luminous energy of the regular reflection and the luminous energy of diffusion.

6. The image forming apparatus according to claim 5, wherein the light source for the surface quality detecting sensor emits infrared (IR) rays.

7. The image forming apparatus according to claim 4, further comprising a light source, wherein the light source irradiates an embossed subject copy in an oblique direction with a luminous flux, the surface quality reading means reads shades due to the embossment of the embossed subject copy, and the surface quality reading means thereby detects the surface quality of the subject copy.

8. The image forming apparatus according to claim 1, wherein the surface quality determining means has a preset level of surface quality determination, and the surface quality determining means determins the surface quality of the subject copy by evaluating surface quality data against the level of surface quality determination.

9. The image forming apparatus according to claim 1, wherein the surface quality determining means has a surface quality pattern database, and the surface quality determining means determines the surface quality of the subject copy by referring the surface quality data to the surface quality pattern database.

10. The image forming apparatus according to claim 1, further comprising a surface quality control means,
wherein the contact member has a predetermined surface quality, and the surface quality control means controls, on the basis of the surface quality determination data, at least one of:
a treatment condition of at least one of the sheet heating means and the sheet cooling means; and
the surface quality of the contact member.

11. The image forming apparatus according to claim 10, wherein the treatment condition is at least one selected from:
heating temperature of the sheet heating means,
pressure of the sheet heating means,
heating duration of the sheet heating means,
duration of pressure application of the sheet heating means,
cooling temperature of the sheet cooling means, and
cooling duration of the sheet cooling means.

12. The image forming apparatus according to claim 10, wherein the surface quality of the contact member is selected from gloss, matte and embossment.

13. The image forming apparatus according to claim 1, wherein the surface treatment means further comprises a gloss control means for controlling the surface gloss of the sheet so that the surface gloss is one of higher than, lower than, and the same as the surface gloss of the subject copy.

14. The image forming apparatus according to claim 1, wherein the surface treatment means further comprises a surface quality partial control means which is configured to form, on a portion of the surface of the sheet, a surface quality different from a surface quality of another portion of the surface of the sheet.

15. The image forming apparatus according to claim 14, wherein the contact member has a different quality at least in a portion thereof.

16. The image forming apparatus according to claim 15, wherein the quality is at least one of surface quality or thermal conductivity.

17. The image forming apparatus according to claim 14, wherein the sheet heating means comprises a thermal head.

18. The image forming apparatus according to claim 1, wherein the contact member is an endless belt.

19. The image forming apparatus according to claim 18, wherein the sheet heating means comprises the endless belt and a pair of heating rollers so arranged to press the endless belt from inside and outside of the endless belt.

20. The image forming apparatus according to claim 1, wherein the sheet comprises a thermoplastic resin layer containing a thermoplastic resin and the sheet heating means heats the sheet to a temperature equal to or above the softening point of the thermoplastic resin in the thermoplastic resin layer.

21. The image forming apparatus according to claim 1, wherein the sheet comprises a thermoplastic resin layer containing a thermoplastic resin and the sheet cooling means cools the sheet to a temperature below the softening point of the thermoplastic resin in the thermoplastic resin layer.

22. The image forming apparatus according to claim 1, wherein the sheet comprises:
a supporting base;
a thermoplastic resin layer; and
an image forming layer, wherein the thermoplastic resin layer and the image forming layer are formed on the supporting base in this order, and the surface quality of the contact member is transferred to a surface of the image forming layer and an interface of the thermoplastic resin layer and the image forming layer.

23. The image forming apparatus according to claim 1, wherein the sheet is selected from a thermosensitive recording sheet, inkjet sheet, electrophotographic sheet, heat developing sheet, silver halide photographic sheet and silver halide digital photographic sheet.

* * * * *